United States Patent
Boyd et al.

(10) Patent No.: US 11,624,849 B2
(45) Date of Patent: Apr. 11, 2023

(54) METHODS FOR DETERMINING TRANSVERSELY ISOTROPIC-ELASTIC CONSTANTS FROM BOREHOLE SONIC VELOCITIES IN STRONGLY TRANSVERSELY-ISOTROPIC FORMATIONS

(71) Applicant: SCHLUMBERGER TECHNOLOGY CORPORATION, Sugar Land, TX (US)

(72) Inventors: Austin Boyd, Ridgefield, CT (US); Vanessa Simoes, Sao Paulo (BR); Bikash Kumar Sinha, Cambridge, MA (US); Smaine Zeroug, Cambridge, MA (US); Anna Paula Lougon Duarte, Rio de Janeiro (BR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 975 days.

(21) Appl. No.: 15/978,972

(22) Filed: May 14, 2018

(65) Prior Publication Data
US 2019/0346581 A1    Nov. 14, 2019

(51) Int. Cl.
    *G01V 1/30*    (2006.01)
(52) U.S. Cl.
    CPC .............. *G01V 1/306* (2013.01); *G01V 1/303* (2013.01); *G01V 2210/626* (2013.01); *G01V 2210/6222* (2013.01); *G01V 2210/6242* (2013.01)

(58) Field of Classification Search
    None
    See application file for complete search history.

(56) References Cited

U.S. PATENT DOCUMENTS

| | | | |
|---|---|---|---|
| 5,200,705 A * | 4/1993 | Clark ................. | G01V 3/20 324/338 |
| 6,614,716 B2 | 9/2003 | Plona et al. | |
| 9,417,352 B2 | 8/2016 | Sinha | |
| 10,353,094 B2 | 7/2019 | Sinha | |
| 11,280,185 B2 * | 3/2022 | Lakings ............ | G01V 1/306 |
| 2010/0284247 A1 * | 11/2010 | Manning ........... | G01V 1/288 367/28 |

(Continued)

OTHER PUBLICATIONS

Backus, G. E., "Long-Wave Elastic Anisotropy Produced by Horizontal Layering", Journal of Geophysical Research, 1962, 67(11), pp. 4427-4440.

(Continued)

*Primary Examiner* — Arleen M Vazquez
*Assistant Examiner* — Brandon J Becker
(74) *Attorney, Agent, or Firm* — Ashley E. Brown

(57) ABSTRACT

A method for estimating all five transversely-isotropic (TI)-elastic constants using borehole sonic data obtained from at least one subterranean borehole in a transversely isotropic formation. In an embodiment, the method includes: solving for a quasi-compressional qP-wave velocity $V_{qP}$ using inversion algorithms based on exact solutions of the Kelvin-Christoffel equations for plane wave velocities in arbitrarily anisotropic formations, where the five TI-elastic constants may include $C_{11}$, $C_{13}$, $C_{33}$, $C_{55}$, and $C_{66}$.

17 Claims, 25 Drawing Sheets

(56) References Cited

U.S. PATENT DOCUMENTS

| | | | | |
|---|---|---|---|---|
| 2015/0012251 | A1* | 1/2015 | Horne | G01V 1/306 |
| | | | | 703/2 |
| 2015/0103624 | A1* | 4/2015 | Thompson | E21B 49/00 |
| | | | | 367/7 |
| 2016/0273346 | A1* | 9/2016 | Tang | E21B 47/06 |
| 2017/0192118 | A1* | 7/2017 | Du | G01V 1/282 |
| 2017/0241260 | A1* | 8/2017 | Gonzalez Perez | E21B 49/10 |
| 2017/0329031 | A1* | 11/2017 | Collins | E21B 49/00 |
| 2018/0058211 | A1* | 3/2018 | Liang | G01V 1/282 |
| 2018/0230782 | A1* | 8/2018 | Pankaj | E21B 49/00 |
| 2018/0355707 | A1* | 12/2018 | Rodriguez Herrera | G01V 1/42 |

OTHER PUBLICATIONS

Berryman, J.G., "Long-wave elastic anisotropy in transversely isotropic media", Geophysics, 1979, 44(5), pp. 896-917.

Ekstrom, M.P., "Dispersion Estimation from Borehole Arrays Using a Modified Matrix Pencil Algorithm", presented at the 29th Asilomar Conference on Signals Systems and Computers, Pacific Grove, California, U.S.A., 1995, pp. 449-453.

Helbig, K., "Transverse isotropy in exploration seismics", Geophysical Journal International, 1984, 76(1), pp. 79-88.

Hornby, B. E. et al., "Anisotropy correction for deviated-well sonic logs: Application to seismic well tie", Geophysics, 2003 68(2), pp. 464-471.

Horne, S. et al., "Elastic anisotropy in the Haynesville shale from dipole sonic data", First Break, 2012, 30, pp. 37-41.

Jocker, J. et al. 2013 "Seismic Anisotropy Characterization in Heterogeneous Formations Using Borehole Sonic Data", SPE 166463 presented at THE SPE Annual Technical Conference, New Orleans, Louisiana, U.S.A., 2013, 11 pages.

Jones, M. J. et al., "Detection of Reflected Energy from Array Sonic Waveforms in Horizontal Wells", SEG Technical Program Abstracts, 1990, 4 pages.

Norris, A. N. et al., "Weak elastic anisotropy and the tube wave," Geophysics, 1993, 58(8), pp. 1091-1098.

Sinha, B. K. et al., "Elastic wave propagation in deviated wells in anisotropic formations," 2006 Annual SEG International Exposition and Annual Meeting Proceedings, SEG, New Orleans, pp. 324-328.

Sinha, B. K., 2014 "Anisotropic elastic constants from dipole flexural dispersions in unconventional shale-gas Reservoirs", SEG Technical Program Expanded Abstracts, 2014, pp. 596-600.

Sinha, B.K. et al., "Borehole Flexural Modes in Anisotropic Formations," Geophysics, 1994, 59(7), pp. 1037-1052.

Thomsen, L. "Weak elastic anisotropy", Geophysics, 1986, 51(10), pp. 1954-1966.

* cited by examiner

METHODS FOR DETERMINING TRANSVERSELY ISOTROPIC-ELASTIC CONSTANTS FROM BOREHOLE SONIC VELOCITIES IN STRONGLY TRANSVERSELY-ISOTROPIC FORMATIONS

BACKGROUND

Exploration and production (E&P) of hydrocarbons in a field, such as an oil field, may be analyzed and modeled. The analysis and modeling may include sedimentary basin simulation, subsurface hydrocarbon reservoir charge modeling, geological modeling, subsurface rock formation petrophysical properties evaluation, and downhole fluid analysis. Based on the result of the analysis and modeling, hydrocarbons may be extracted from the field. Thus, accurate models are useful for the extraction of hydrocarbons.

Acoustic measurements may be used to evaluate a borehole in a geological formation. Generally speaking, downhole sonic tools may use monopole or dipole sonic transmitters to obtain sonic measurements. A monopole transmitter emits energy equally in omni-direction away from its center, while a dipole transmitter emits energy in a particular direction. To identify fractures in a borehole, monopole transmitters may be used in what is referred to as a low frequency Stoneley waveform analysis. Specifically, a Stoneley wave propagates along the interface between the borehole fluid and the formation. Thus, the monopole low frequency sonic signal may attenuate depending on characteristics of the geological formation along the borehole, such as a fracture or permeable zone. Accordingly, monopole Stoneley waveform analysis may be a useful tool to identify fracture or permeable zones in a borehole.

Monopole waveforms may include multiple packets of coherent arrivals that include monopole refracted headwaves followed by a sequence of borehole modal arrivals, such as, the Stoneley and pseudo-Rayleigh modes. Monopole refracted headwaves may include monopole compressional and shear headwaves. Monopole compressional headwaves may be recorded by an array of receivers in both the fast and slow formations, whereas monopole shear headwaves may be detected only in fast formations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein may relate to a method for estimating all five transversely-isotropic (TI)-elastic constants using borehole sonic data obtained from at least one subterranean borehole in a transversely isotropic formation, the method may include: solving for a quasi-compressional qP-wave velocity $V_{qP}$ using inversion algorithms based on exact solutions of the Kelvin-Christoffel equations for plane wave velocities in arbitrarily anisotropic formations, where the five TI-elastic constants may include $C_{11}$, $C_{13}$, $C_{33}$, $C_{55}$, and $C_{66}$.

In another aspect, embodiments disclosed herein may relate to a method for estimating all five transversely-isotropic (TI)-elastic constants using borehole sonic data obtained from a horizontal borehole in a transversely isotropic formation, the method may include: recording monopole and cross-dipole waveforms at an array of receivers in the horizontal borehole parallel to an $X_1$-axis that is perpendicular to a TI-symmetry $X_3$-axis; processing the monopole refracted headwaves to output monopole compressional modulus $C_{11}$; processing fast-dipole waveforms to estimate shear modulus $C_{66}$; processing slow-dipole waveforms to estimate shear modulus $C_{55}$; solving three travel-time equations for $C_{33}$, $C_{13}$, and reflector distance D, using as inputs $C_{11}$, $C_{55}$, $C_{66}$ from the borehole sonic data from the horizontal borehole, where reflection data analysis provides estimates of arrival times $t_1$, $t_2$, $t_3$; sub-array offsets $z_1$, $z_2$, and $z_3$; and ray-path directions $\theta_1$, $\theta_2$, and $\theta_3$, where the horizontal borehole is parallel to an $X_1$-axis that is perpendicular to a TI-symmetry $X_3$-axis, and where the method may further include outputting the five TI-elastic constants and the reflector distance D based on a weak anisotropy assumption for the quasi-compressional wave velocity $V_{qP}(\theta)$.

In another aspect, embodiments disclosed herein may relate to a system for locating hydrocarbons in a transversely-isotropic (TI) formation including: a borehole sonic tool that measures borehole sonic data along at least one subterranean borehole in the formation; a processor that processes the borehole sonic data to determine all five TI-elastic constants as a function of position along at least one borehole; an output device that outputs the five TI-elastic constants as a function of position along the borehole, where determining the five TI-elastic constants may include: solving for a quasi-compressional qP-wave velocity $V_{qP}$ using inversion algorithms based on exact solutions of the Kelvin-Christoffel equations for plane wave velocities in arbitrarily anisotropic formations, and where the five TI-elastic constants may include $C_{11}$, $C_{13}$, $C_{33}$, $C_{55}$, and $C_{66}$.

Other aspects and advantages of the claimed subject matter will be apparent from the following description and the appended claims.

DETAILED DESCRIPTION

Figure 1:
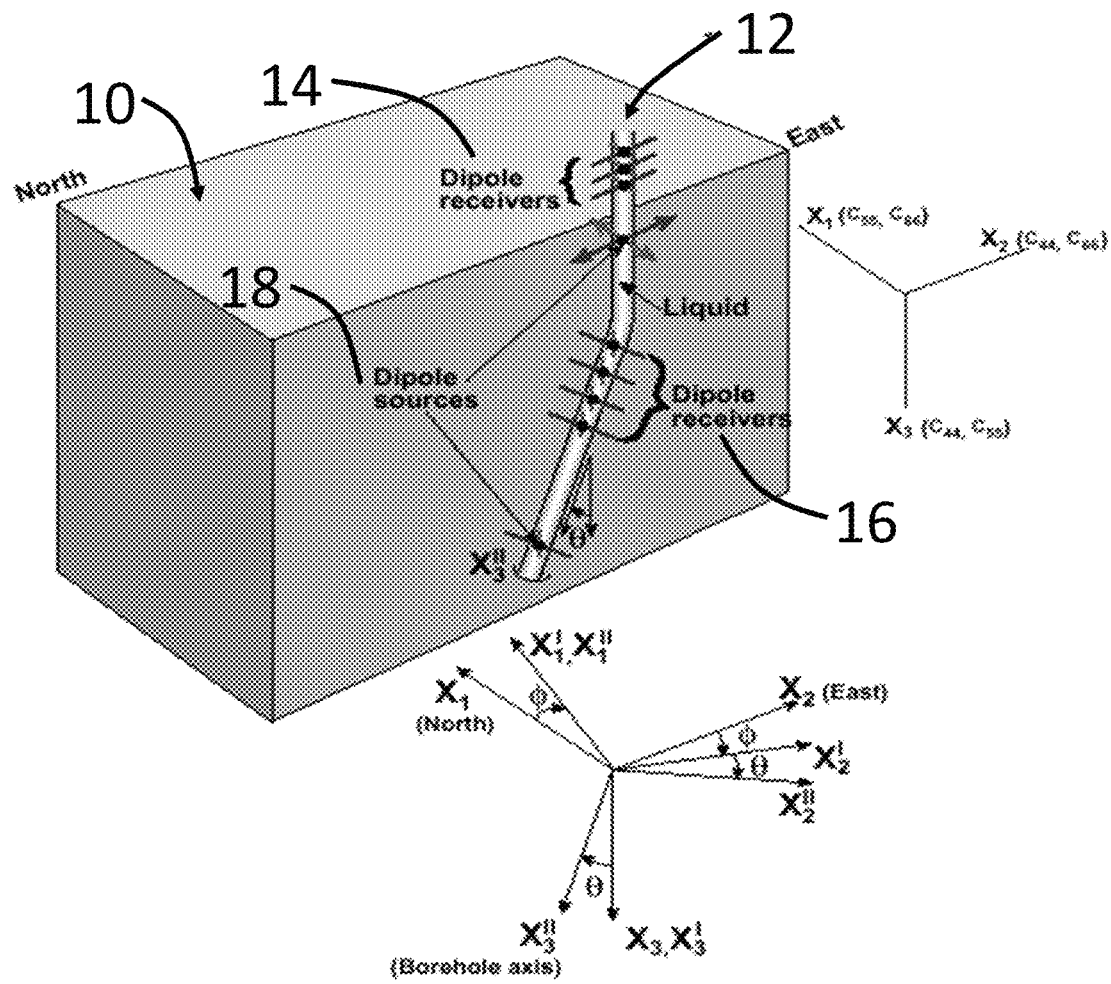
FIG. 1 is a schematic diagram of vertical and deviated boreholes in accordance with embodiments of the present disclosure.

Organic rich shale reservoirs may exhibit Transverse Isotropy (TI) with the vertical symmetry axis (TIV), but producing wells are often drilled horizontally. TIV formations may be characterized by three Thomsen parameters, $\varepsilon$, $\delta$, and $\gamma$, which can predict sonic velocities from VP0 and VS0 in terms of the well's deviation from the vertical axis. VP0 and VS0 denote the compressional and shear velocities for propagation direction parallel to the TI-symmetry ($X_3$-) axis and the deviation from the TI-symmetry axis is 0 degree. These parameters may be derived from two or more wells with different well deviations or by inverting flexural wave dispersion in a vertical well. The majority of production from organic rich shales is often from horizontal wells, and an accurate characterization of the anisotropic elastic properties of these formations may be relevant for hydraulic fracture design and simulation monitoring using microseismic.

A Transversely-Isotropic (TI) formation may be characterized by five independent TI-elastic constants ($C_{11}$, $C_{33}$, $C_{44}$, $C_{66}$, and $C_{13}$) as in Eq. (17) below. These TI-elastic constants may be used to calculate elastic stiffnesses in different directions with respect to the borehole axis. Elastic stiffnesses may be described in terms of vertical and horizontal Young's moduli and Poisson's ratios. Here the vertical direction is parallel to the TI-symmetry axis and horizontal plane is perpendicular to the vertical direction. Hydraulic fracturing of formations for stimulating enhanced hydrocarbon production may be facilitated by identifying intervals that would support deep fractures for the fluid to flow into the producer well. Such intervals may be identified as regions with higher fracturability and may be characterized by large Young's moduli and small Poisson's ratios; they are sometimes also referred to as brittle rocks. Mechanical properties of formations in terms of Young's moduli and Poisson's ratios may be estimated from the five TI-elastic constants. In addition, formation stress distributions may also be estimated from the five TI-elastic constants. Generally, hydraulic fractures are bound by layers with higher stresses than the hydrocarbon-bearing layer.

Estimation of all five TI-elastic constants may require measurements of the quasi-compressional (qP), pure shear (SH) and quasi-shear (qSV) wave velocities along boreholes with different deviations from the TI-symmetry axis within a reasonably uniform lithology interval. A reasonably uniform lithology interval may refer to a shale formation in the presence of thin layers with small contrasts (<10%) in elastic stiffnesses from the host shale rock formation. In particular, such interbedded layers may not cause any reflections of elastic waves at sonic frequencies ranging from 0.2 to 20 kHz.

A quasi-compressional wave is a general term that covers any propagation direction of the wave from the TI-symmetry axis. These velocities may be reliably estimated from a conventional processing of monopole and cross-dipole waveforms. Monopole waveforms may be generated by a monopole source. Cross-dipole waveforms may be generated by two orthogonal dipole sources. These sources may be located on a sonic tool. Fast-dipole and slow-dipole waveforms may be generated by two orthogonal dipole transmitters oriented parallel to the fast- and slow-shear polarization directions, respectively. These waveforms may be recorded by two sets of orthogonal receivers aligned with the fast and slow dipole sources or transmitters.

In one or more embodiments, monopole refracted headwaves may be generated by a monopole source, or transmitter, and may be recorded by an array of hydrophone receivers such as those located on a sonic tool. The received monopole signals may then be processed to obtain compressional or quasi-compressional velocities.

In one or more embodiments, algorithms invert the qP, qSV, and SH wave velocities in a given depth interval with a reasonably uniform lithology obtained from any of the following four different combinations of borehole deviations: (a) vertical and deviated; (b) horizontal and deviated; (c) two different deviations; and (d) vertical, horizontal and deviated.

In one or more embodiments, algorithms use sonic data from a single horizontal borehole together with reflection data from a horizontal proximate stiff layer, e.g., a limestone layer, acquired at multiple sub-arrays of receivers in the horizontal borehole.

In one or more embodiments, algorithms use sonic data from a single horizontal borehole together with refraction and reflection data from a horizontal proximate stiff layer, e.g., a limestone layer, acquired at multiple sub-arrays of receivers in the horizontal borehole.

In accordance with one or more embodiments of the present disclosure, inversion algorithms are based on exact solutions of the Kelvin-Christoffel equations for plane wave velocities in arbitrarily anisotropic formations. Closed-form expressions for the TI-elastic constants do not use any weak anisotropy approximation.

Horizontal drilling in organic-shale reservoirs is often used to produce hydrocarbons commercially. However, optimal placement of fracturing stages and perforation clusters along lateral producer wells becomes a challenging task when the formation stresses and mechanical property logs do not capture shale heterogeneities. Some techniques of estimating all five TI-elastic constants are based on using sonic data from multiple wells with different deviations that invariably average anisotropic properties over large volumes of shale reservoirs. To overcome these limitations, it is desirable to obtain all five TI-elastic constants from a single horizontal well data.

Methods in accordance with the present disclosure may utilize new techniques that enable estimates of all five TI-elastic constants of the shale reservoir as a function of logged depth along a lateral producer well. In one or more embodiments, methods may combine horizontal well sonic data processing with the reflection and refraction data obtained in the presence of a horizontal proximate stiff layer, e.g., limestone (or other stiff stringers) embedded in a shale formation. Stringers may be defined as thin and stiff layers embedded in a relatively thick sand or shale formation. Outputs from a horizontal well sonic data processing may yield three of the five TI-elastic constants, whereas combining sonic data with the reflection and refraction data provide the remaining two TI-elastic constants. Once all five TI-elastic constants are determined with the axial resolution of a sonic tool along a horizontal well, formation horizontal stresses and rock mechanical properties may be known as a function of logged depth, where logged depth is understood to be a position along the borehole and may be different from true vertical depth (TVD). High axial resolution of stresses and mechanical properties may enable a more reliable completion strategy of properly placing the fracturing stages and perforation clusters in the presence of local shale heterogeneities.

Sonic tools in accordance with the present disclosure may include a sonic source placed in a fluid-filled borehole that generates headwaves as well as other borehole-guided modes. A sonic measurement system in accordance with the present disclosure may include placing a piezoelectric source and an array of hydrophone receivers inside a fluid-filled borehole. Piezoelectric sources may be configured in the form of either a monopole, dipole, or quadrupole source. The source bandwidth may range from a 0.2 to 20 kHz in some embodiments. Monopole sources in accordance with the present disclosure may generate lowest-order axisymmetric modes, also referred to as a Stoneley mode, together with quasi-compressional and shear headwaves in fast formations. A fast formation is characterized as a formation in which the formation shear wave velocity is larger than the borehole-liquid (mud) compressional wave velocity.

In contrast, dipole sources may excite lowest-order flexural borehole mode together with quasi-compressional and shear headwaves. Shear headwaves are produced by the coupling of the transmitted sonic energy to plane waves in the formation that propagate along the borehole axis. An incident quasi-compressional wave in the borehole fluid produces critically refracted quasi-compressional waves in the formation. Those refracted along the borehole surface are known as quasi-compressional headwaves. The critical incidence angle $\theta_i = \sin^{-1}(V_f/V_c)$, where $V_f$ is the quasi-compressional wave speed in the borehole fluid; and $V_c$ is the quasi-compressional wave speed in the formation. As the quasi-compressional headwave travels along the interface, the quasi-compressional headwave may radiate energy back into the fluid that may be detected by hydrophone receivers placed in the fluid-filled borehole.

In fast formations, the shear headwave may be similarly excited by a quasi-compressional wave at the critical incidence angle $\theta_i = \sin^{-1}(V_f/V_s)$, where $V_s$ is the shear wave speed in the formation. It is also worth noting that headwaves are excited only when the wavelength of the incident wave is smaller than the borehole diameter so that the boundary may be effectively treated as a planar interface. In a homogeneous and isotropic model of fast formations, as above noted, quasi-compressional and shear headwaves may be generated by a monopole source placed in a fluid-filled borehole for determining the formation quasi-compressional and shear wave speeds. Refracted shear headwaves cannot be detected in slow formations (where the shear wave velocity is less than the borehole-fluid compressional wave velocity) with receivers placed in the borehole fluid. In slow formations, formation shear wave velocities may be obtained from the low-frequency asymptote of flexural dispersion. There are standard processing techniques for the estimation of formation quasi-compressional and shear wave velocities in either fast or slow formations from an array of recorded dipole waveforms. One of the techniques is based on a Slowness-Time-Coherence (STC) processing algorithm that estimates a non-dispersive slowness of an arrival from an array of waveforms over a chosen frequency filter and sampling window, where wave slowness is the inverse of wave velocity.

Another technique uses variations of Prony's algorithm, such as a modified matrix pencil algorithm, which isolates both dispersive and non-dispersive arrivals in a recorded wavetrain. Sonic logging may provide measurements of non-dispersive and dispersive arrivals that may be analyzed to estimate elastic properties of the propagating medium. In addition, monopole and dipole sources may generate plane quasi-compressional and shear waves into the surrounding formation at different incidence angles that are reflected back from a stiffer layer into the formation and may be detected by the hydrophone receivers located close to the borehole surface. When the incident wave strikes the stiffer layer at a critical angle, the refracted plane wave propagates along the interface of the layer and formation. Subsequently, this refracted wave travels back to the formation and may also be detected by the hydrophone receivers placed close to the borehole surface. Plane wave velocities and polarization vectors for wave propagation along an arbitrary direction in anisotropic formations may be described by the Kelvin-Christoffel equations of motion in the transformed coordinate system that eliminates the need for obtaining the polarization vectors defined with respect to the anisotropy axes.

A borehole sonic tool measures the quasi-compressional, two shear, and Stoneley wave slownesses for propagation along the borehole axis. An arbitrarily deviated borehole may have an azimuth $\varphi$ from the north, and a deviation $\theta$ from the vertical. If $X_1$-, $X_2$-, and $X_3$-axes are along the north, east, and vertical directions, respectively, rotation about the $X_3$-axis defines the well azimuth $\varphi$, and rotation about the $X_1$-axis denotes the well deviation $\theta$. The deviated well axis is now parallel to the $X_3''$-axis, and the cross-sectional plane is in the $X_1''$-$X_2''$ plane. The well azimuth $\varphi$ and the well deviation $\theta$ are also referred to as the two Euler angles for the rotated axes referred to the reference $X_1$-, $X_2$-, and $X_3$-axes.

The propagation of plane waves along any of the rotated $X_1''$-, $X_2''$-, or $X_3''$-axes may now be described by Eq. (1):

$$C_{ijkl}^{\|} u_{k,li} = \rho \ddot{u}_j, \quad (1)$$

where $C_{ijkl}^{\|}$ denotes the rotated TI-elastic constants, and is related to the TI-elastic constants in the reference coordinate axes by the following orthogonal transformation of a fourth-rank tensor shown in Eq. (2):

$$C_{ijkl}^{\|} = a_{ip} a_{jq} a_{kr} a_{ls} C_{pqrs}, \quad (2)$$

and the rotation matrix $a_{ij}$ is given by Eq. (3):

$$[a] = \begin{bmatrix} \cos\phi & \sin\phi & 0 \\ -\sin\phi\cos\theta & \cos\phi\cos\theta & \sin\theta \\ \sin\phi\sin\theta & -\cos\phi\sin\theta & \cos\theta \end{bmatrix}, \quad (3)$$

where $\varphi$ and $\theta$ are the first two Euler rotations about the $X_3$-, and $X_1'$-axes, respectively. The third rotation $\psi$ about the $X_3^{\|}$-axis is assumed to be zero.

The propagation of plane waves along the deviated borehole $X_3^{\|}$-axis may be described by Eq. (4)

$$C_{3jk3}^{\|} u_{k,33} = \rho \ddot{u}_j \quad (4)$$

where the plane wave solution referred to the rotated axes is now expressed as in Eq. (5):

$$u_j = A_j e^{ik_3(x_3 - Vt)}. \quad (5)$$

Eq. (4) may be written as shown below in Voigt's compressed notation for the elastic stiffnesses referred to the rotated axes and after suppressing double primes on the TI-elastic constants for clarity as expressed in Eqs. (6)-(8):

$$C_{55} u_{1,33} + C_{45} u_{2,33} + C_{35} u_{3,33} = \rho \ddot{u}_1, \quad (6)$$

$$C_{45} u_{1,33} + C_{44} u_{2,33} + C_{34} u_{3,33} = \rho \ddot{u}_2, \quad (7)$$

$$C_{55} u_{1,33} + C_{34} u_{2,33} + C_{33} u_{3,33} = \rho \ddot{u}_3, \quad (8)$$

where all quantities are now referred to the rotated axes.

Substitution of the plane wave solution (5) into Eqs. (6)-(8) yields as expressed in Eq. (9):

$$[M]\{A\} = \{0\}, \quad (9)$$

where M is a symmetric, positive-definite (3×3) matrix, and its elements are given by Eqs. (10)-(15)

$$M(1,1) = C_{55} - \rho V^2, \quad (10)$$

$$M(1,2) = C_{45}, \quad (11)$$

$$M(1,3) = C_{35}, \quad (12)$$

$$M(2,2) = C_{44} - \rho V^2, \quad (13)$$

$$M(2,3) = C_{34}, \quad (14)$$

$$M(3,3) = C_{33} - \rho V^2, \quad (15)$$

and the components $A_1$, $A_2$, and $A_3$ of the polarization vector along the $X_1$, $X_2$, and $X_3$-directions, respectively, are expressed in Eq. (16):

$$\{A\} = [A_1 A_2 A_3]^T. \quad (16)$$

The three plane wave velocities may be obtained by setting the determinant of the matrix M=0. For each of the plane wave velocities, the amplitude ratios defining the polarization vector may be solved for from Eq. (9).

TI-Anisotropy

Referring to FIG. 1, a borehole 12 may pass through a portion of a subterranean formation 10. The formation 10 may be a TI-formation. The borehole 12 may be vertical, deviated, or horizontal (not shown) in orientation and liquid-filled. When the formation 10 is logged using a sonic tool, a plurality of dipole sources 18 and dipole receivers 14, 16 may be present in the borehole.

Ignoring the borehole problem for the moment, one may consider the propagation of plane waves in a few TI-formations. Assume the TI-symmetry axis to be parallel to the $X_3$-axis as shown in FIG. 1. The orientation of an arbitrarily deviated well 12 with respect to the TI-axes is defined in term of azimuth $\phi$ measured from the north direction, and deviation $\theta$ measured from the vertical $X_3$-direction. The formation anisotropy defined with respect to the rotated $X_1^{\|}$-, $X_2^{\|}$, and $X_3^{\|}$-axes is referred to as the tilted TI-anisotropy as shown in FIG. 1. Note that the tilted TI-elastic constants are independent of the azimuth $\phi$ in a TI-formation.

The TI-elastic constants with the $X_3$-axis parallel to the symmetry axis takes the form as expressed in Eq. (17):

$$C_{ij} = \begin{bmatrix} C_{11} & C_{12} & C_{13} & 0 & 0 & 0 \\ & C_{11} & C_{13} & 0 & 0 & 0 \\ & & C_{33} & 0 & 0 & 0 \\ & & & C_{44} & 0 & 0 \\ & & & & C_{55} & 0 \\ & & & & & C_{66} \end{bmatrix}, \quad (17)$$

where $C_{66} = (C_{11} - C_{12})/2$, and we have used Voigt's compressed notation that combines the two indices into one using the following transformation: (11→1), (22→2), (33→3), (23→4), (31→5), and (12→6). Thus, for example, $C_{1212} \to C_{66}$.

Table 1 contains the five independent TI-elastic constants for three different formations. These TI-elastic constants together with mass density are sufficient to calculate the three plane wave velocities or slownesses for propagation along any direction with respect to the TI-symmetry axis. Sometimes it may be convenient to work with the two moduli $C_{33}$ and $C_{44}$, and three dimensionless anisotropy parameters, ε, η, and γ, each of which vanishes when the medium is isotropic as expressed in Eq. (18):

$$\varepsilon = \frac{C_{11} - C_{33}}{2C_{33}}, \quad (18)$$

$$\gamma = \frac{C_{66} - C_{44}}{2C_{44}},$$

$$\eta = \frac{C_{13} + 2C_{44} - C_{33}}{C_{33}},$$

$$\delta = \frac{(C_{13} + C_{44})^2 - (C_{33} - C_{44})^2}{2C_{33}(C_{33} - C_{44})},$$

where ε, γ, and δ are widely used Thomsen parameters for characterizing TI formations. Transverse isotropy may be caused by the existence of finely layered isotropic constituents. It has been shown that ε>δ, for TI media formed from laminated isotropic materials. δ provides a measure of the variation of the P-wave velocity with the phase angle and may be expressed as a function of the stiffness coefficients as shown in Eq. (18). δ relates vertical velocity to $V_{NMO}$ in seismic imaging and describes near offset variation. δ may be useful for time-to-depth conversion. η is a measure of an ellipticity for polar anisotropy and relates $V_{NMO}$ to horizontal velocity.

TABLE 1

TI-elastic constants and mass density

| Lithology | C11 (GPa) | C13 (GPa) | C33 (GPa) | C44 (GPa) | C66 (GPa) | ρ (kg/m³) |
|---|---|---|---|---|---|---|
| Austin chalk | 22 | 12 | 14 | 2.4 | 3.1 | 2200 |
| Bakken shale | 40.9 | 8.5 | 26.9 | 10.5 | 15.3 | 2230 |
| Cotton valley shale | 74.73 | 25.29 | 58.84 | 22.05 | 29.99 | 2640 |

Figure 2A:
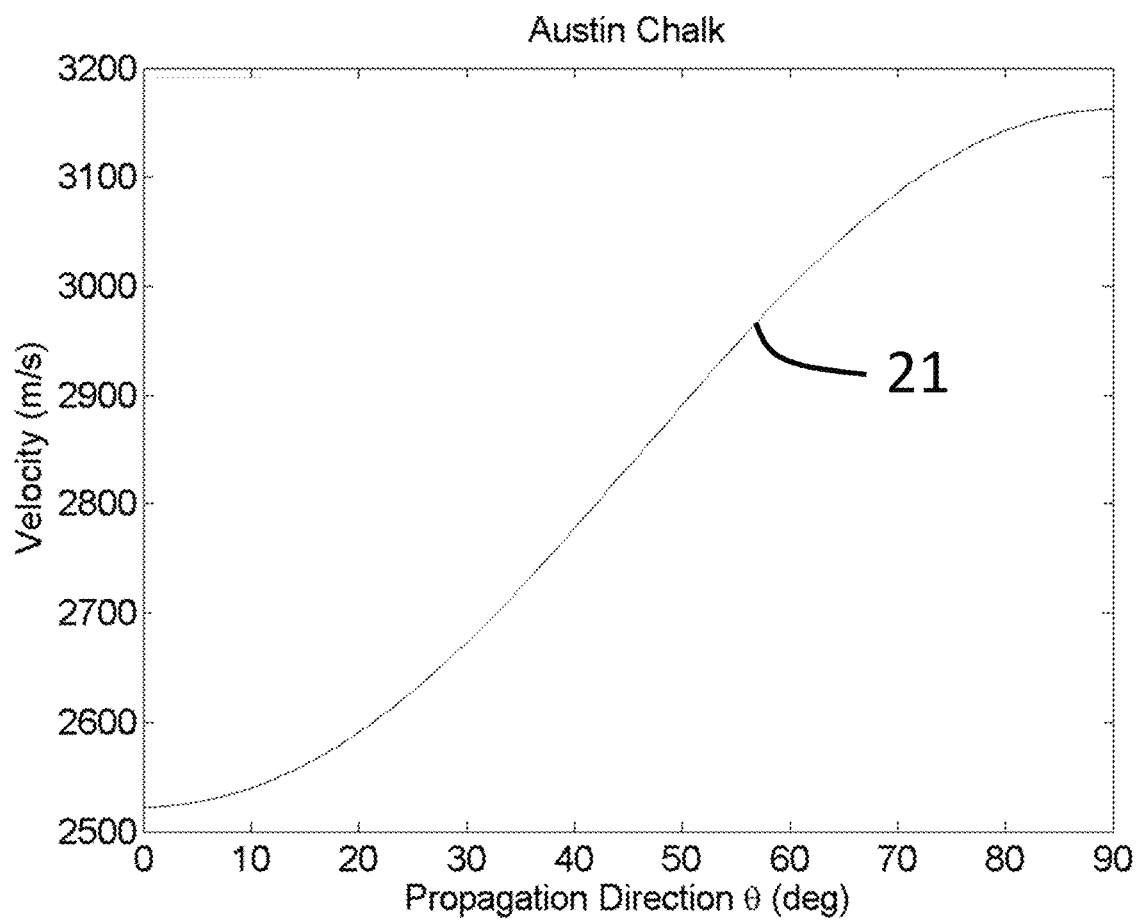
FIG. 2A is a plot of quasi-compressional (qP-) velocity as a function of propagation direction from the TI-symmetry axis in Austin chalk in accordance with embodiments of the present disclosure.
Figure 2B:
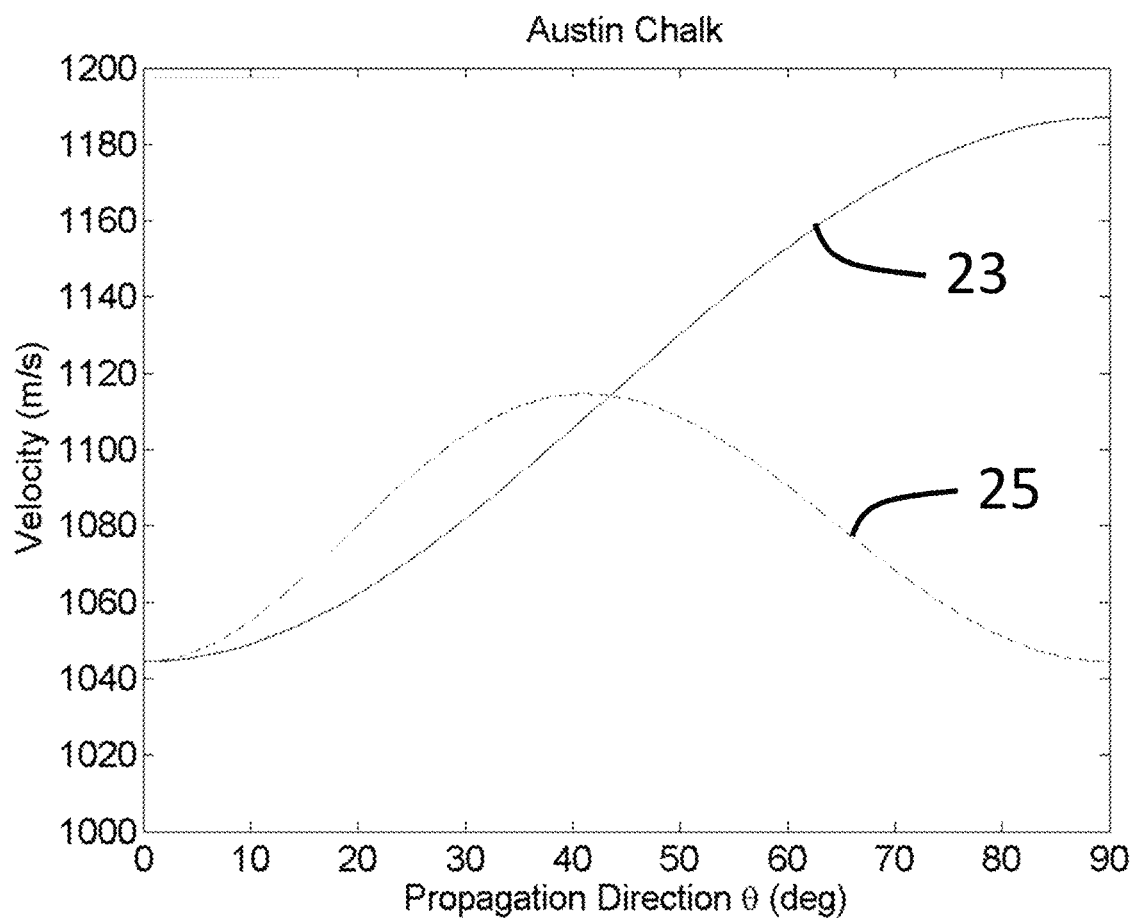
FIG. 2B is a plot of SH-wave velocity and qSV-wave velocity as functions of propagation direction from the TI-symmetry axis in Austin chalk in accordance with embodiments of the present disclosure.
Figure 2C:
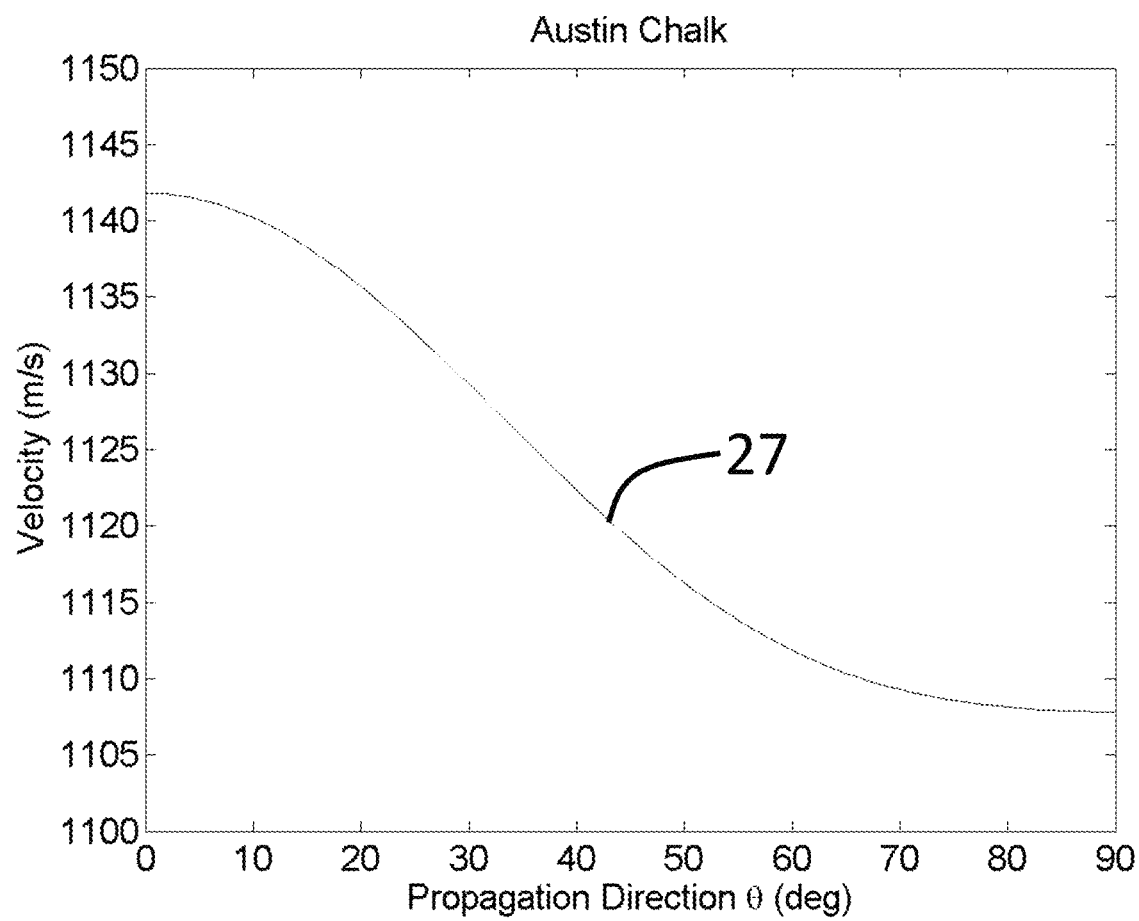
FIG. 2C is a plot of tube wave velocity as a function of propagation direction from the TI-symmetry axis in Austin chalk in accordance with embodiments of the present disclosure.

FIGS. 2A and 2B respectively, show the three plane wave velocities in Austin chalk for quasi-P (qP-) 21; and quasi-SV (qSV-) 25, and SH-polarized waves 23 propagating along the borehole ($X_3^\parallel$-) axis as a function of well deviation angle θ, also referred to as propagation direction. These results have been obtained from the solution of Eq. (9). Note that θ=0 degree, refers to the propagation direction parallel to the TI-symmetry axis that corresponds to the VTI-anisotropy. Similarly, θ=90 degrees would correspond to the HTI-anisotropy. Notice that the qSV-25 and SH-polarized 23 velocities are rather close to each other for well deviations less than about 40 degrees. FIG. 2C depicts tube wave velocity 27 variations as a function of propagation direction from the TI-symmetry axis.

Figure 3A:
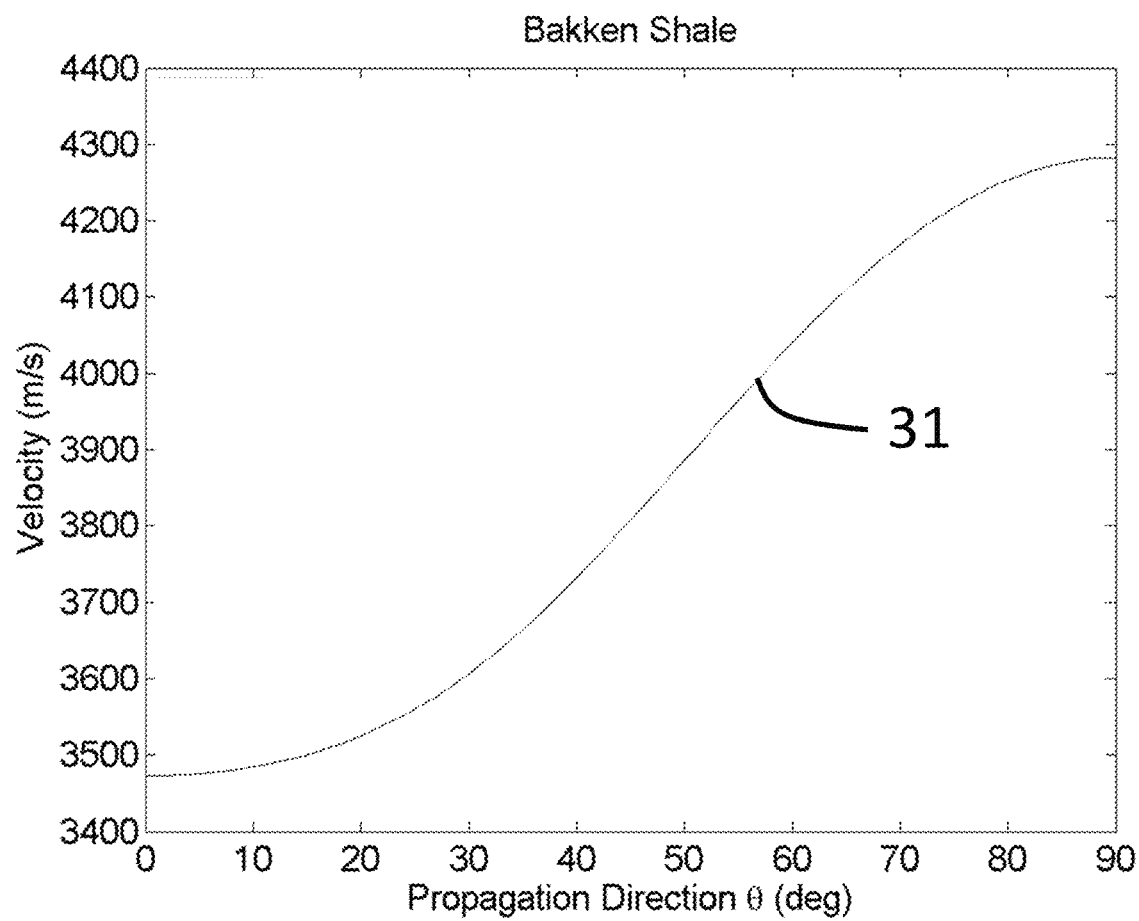
FIG. 3A is a plot of quasi-compressional (qP-) velocity as a function of propagation direction from the TI-symmetry axis in Bakken shale in accordance with embodiments of the present disclosure.
Figure 3B:
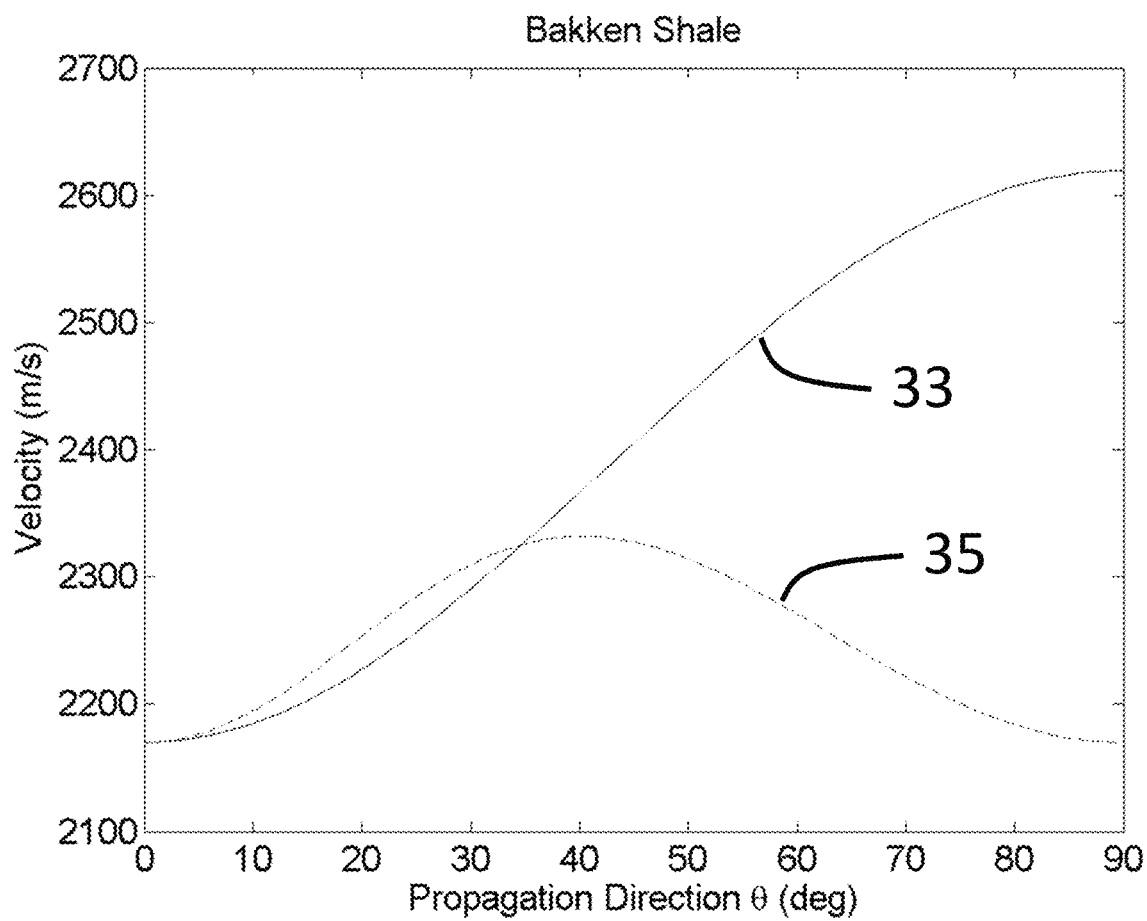
FIG. 3B is a plot of SH-wave velocity and qSV-wave velocity as functions of propagation direction from the TI-symmetry axis in Bakken shale in accordance with embodiments of the present disclosure.
Figure 3C:
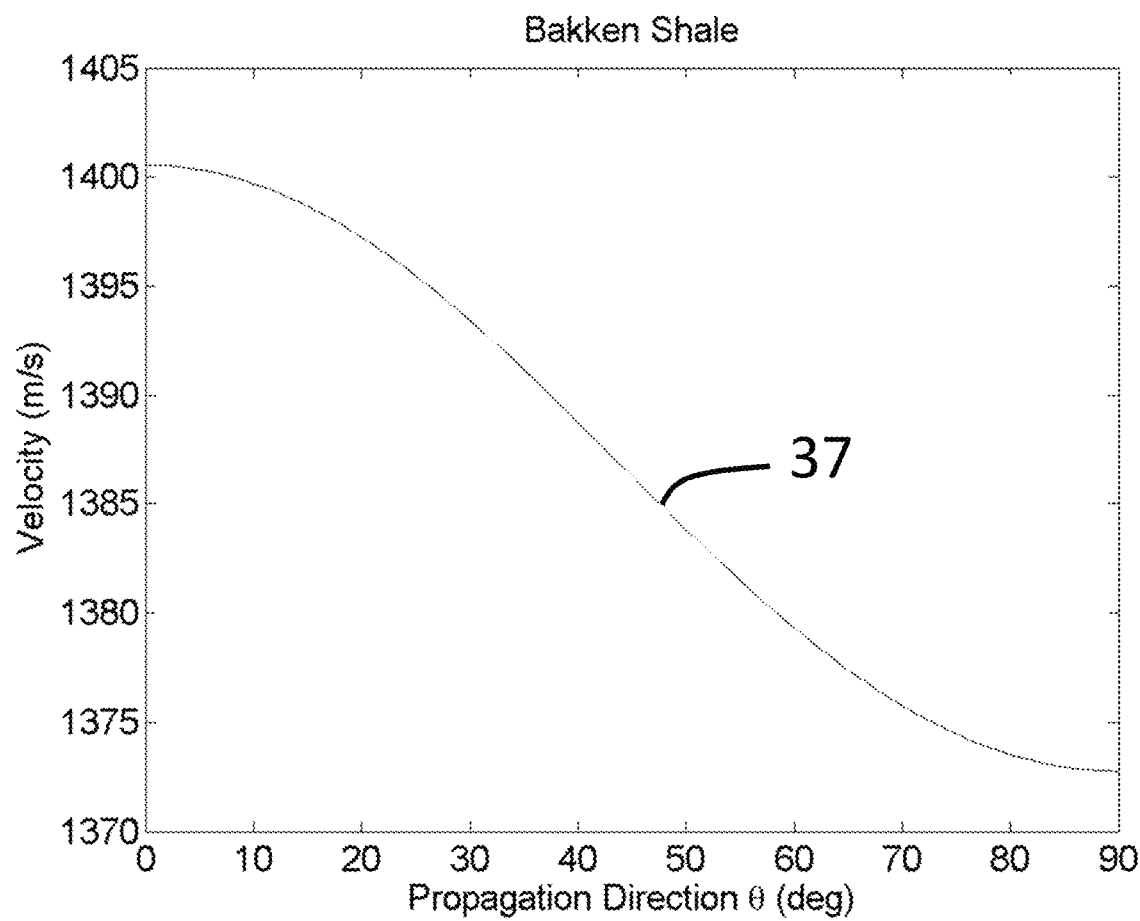
FIG. 3C is a plot of tube wave velocity as a function of propagation direction from the TI-symmetry axis in Bakken shale in accordance with embodiments of the present disclosure.

FIGS. 3A, 3B, and 3C, respectively, display similar results for a fast Bakken shale formation. FIG. 3A displays qP-wave velocity 31 as a function of propagation direction, which is in this case the same as the well deviation. Bakken shale also exhibits rather small differences between the qSV-35 and SH-wave 33 velocities for deviation angles less than about 35 degrees. The qSV-35 and SH-wave 33 velocities corresponding to the shear moduli $C_{44}$ and $C_{55}$, respectively, may be measured with a cross-dipole sonic tool. FIG. 3C displays tube wave velocity 37 as a function of propagation direction.

Figure 4A:
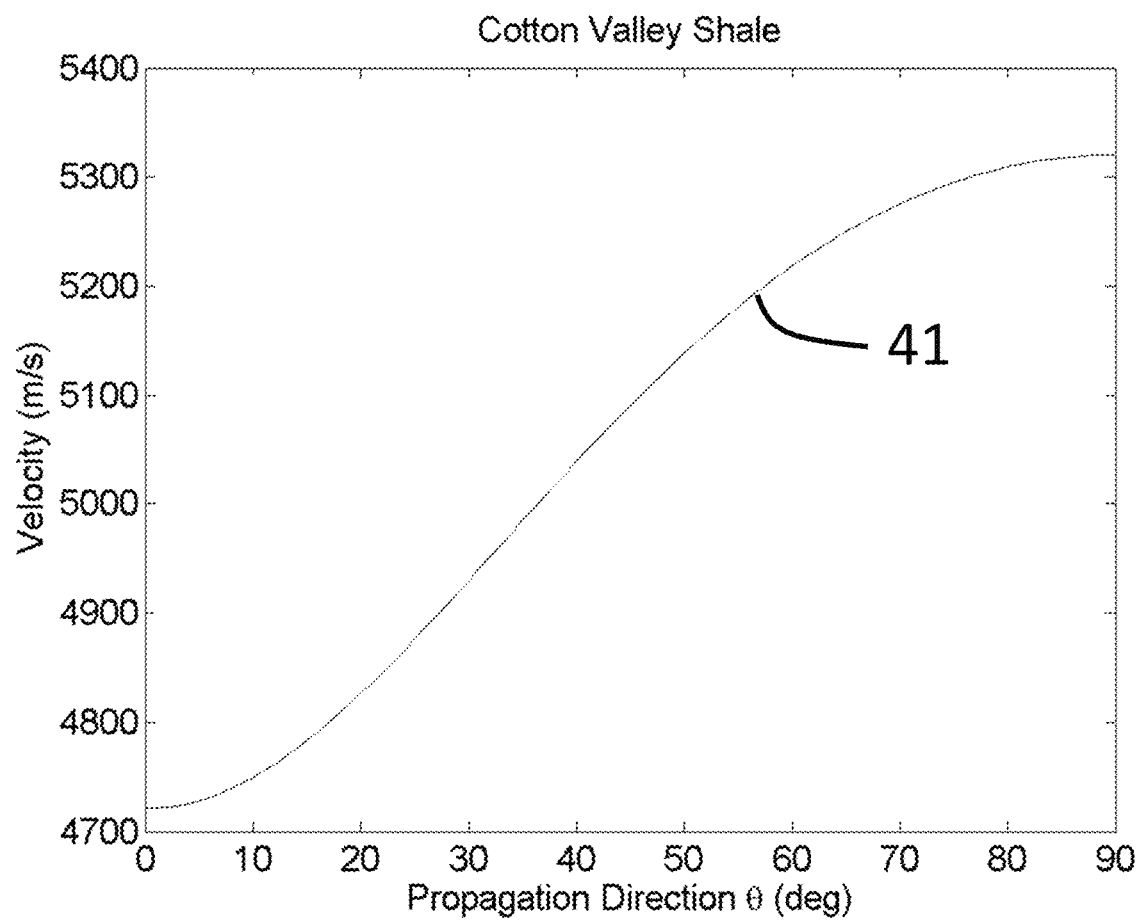
FIG. 4A is a plot of quasi-compressional (qP-) velocity as a function of propagation direction from the TI-symmetry axis in Cotton Valley shale in accordance with embodiments of the present disclosure.
Figure 4B:
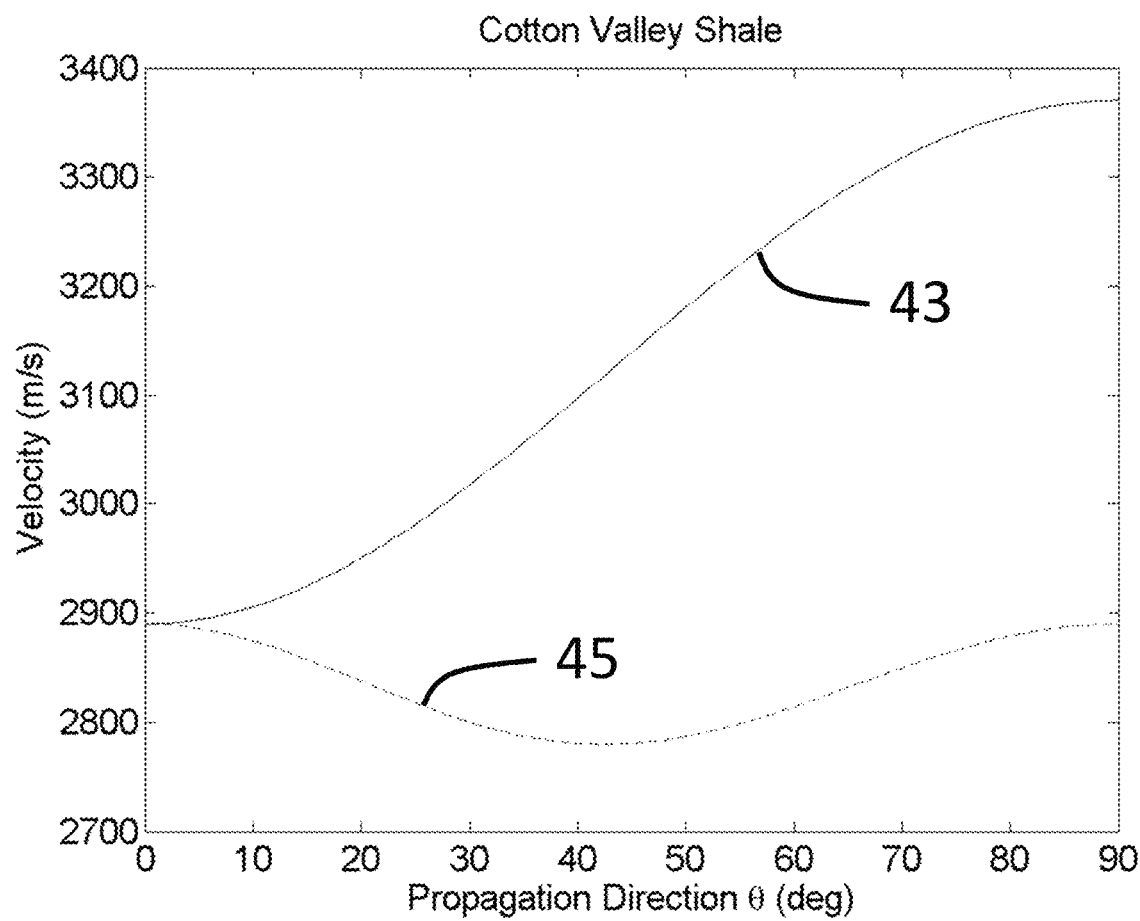
FIG. 4B is a plot of SH-wave velocity and qSV-wave velocity as functions of propagation direction from the TI-symmetry axis in Cotton Valley shale in accordance with embodiments of the present disclosure.
Figure 4C:
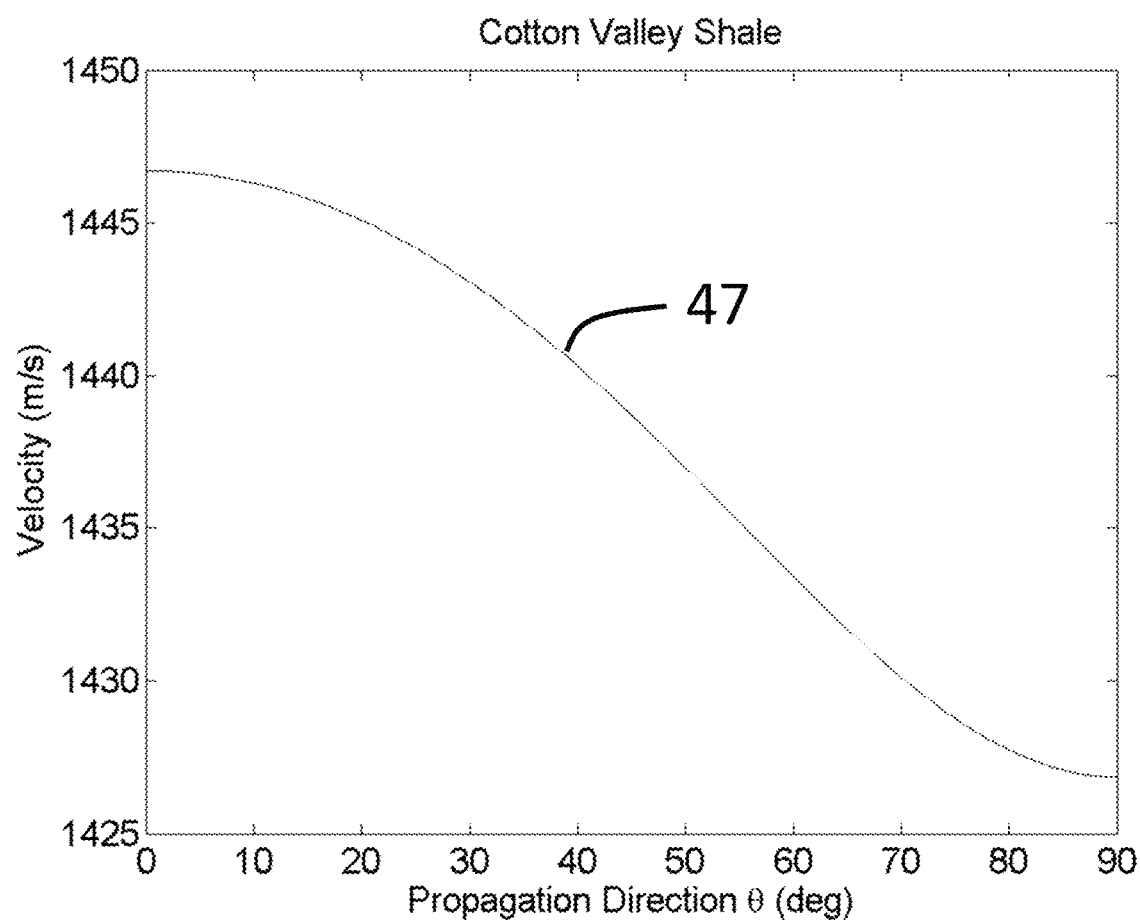
FIG. 4C is a plot of tube wave velocity as a function of propagation direction from the TI-symmetry axis in Cotton Valley shale in accordance with embodiments of the present disclosure.

In FIGS. 4A, 4B, and 4C, respectively, we show similar results for the qP-41, qSV-45, and SH-wave 43 velocities in Cotton valley shale. Unlike the previous two cases, there are significant differences between the qSV-45 and SH-wave 43 velocities for most of the deviation angles except for the VTI-anisotropy.

These results may be useful to identify potential errors in the input data to the estimation of TI-elastic constants. For example, if the measured dipole shear slownesses (or velocities) are nearly the same and the relative dip with respect to the borehole axis is about 60 degrees, it is a clear indication that the input data is NOT consistent with a TI-model. One cannot expect the SH and qSV-wave velocities to be nearly the same for propagation direction of 60 degrees from the TI-symmetry axis. Insofar as the cross-dipole shear velocities are reliable and robust measurements, a more likely source of error is in the estimate of relative dip angle that might have been caused by uncertainties in the dip azimuth and dip angle.

Figure 5:
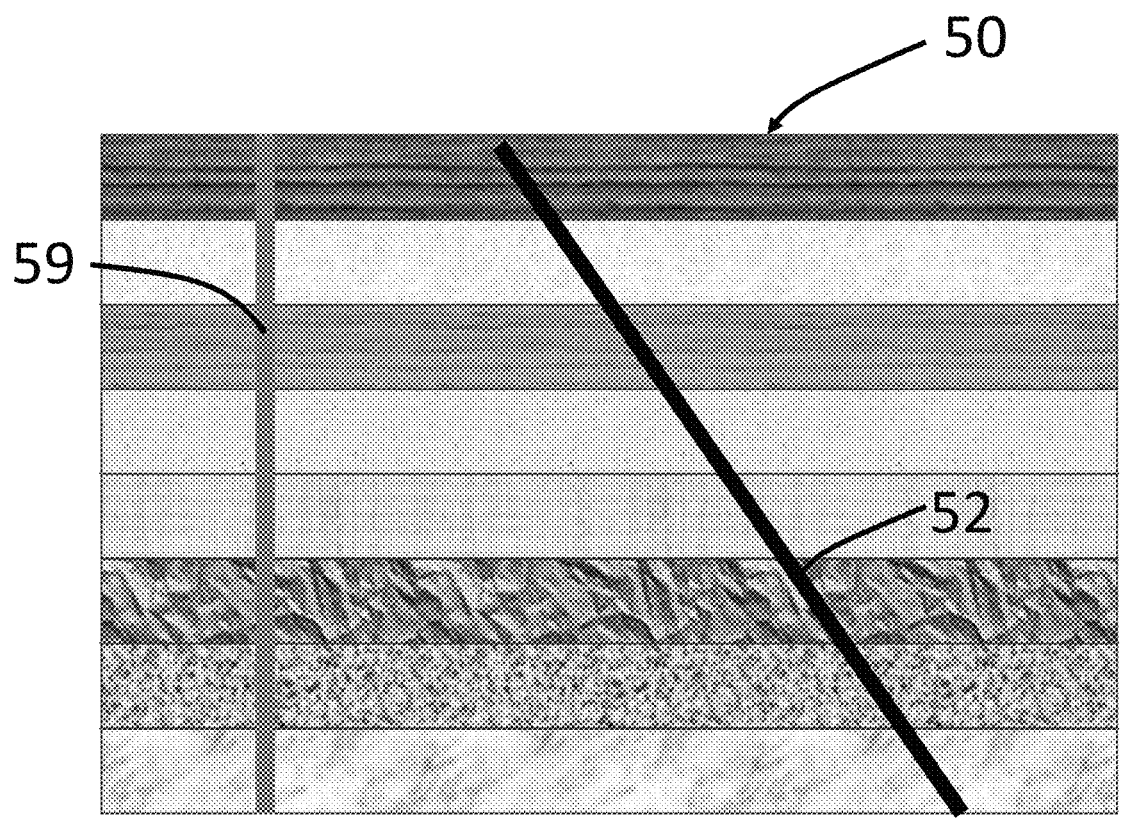
FIG. 5 is a schematic diagram of a vertical and a deviated borehole in accordance with embodiments of the present disclosure.
Figure 6:
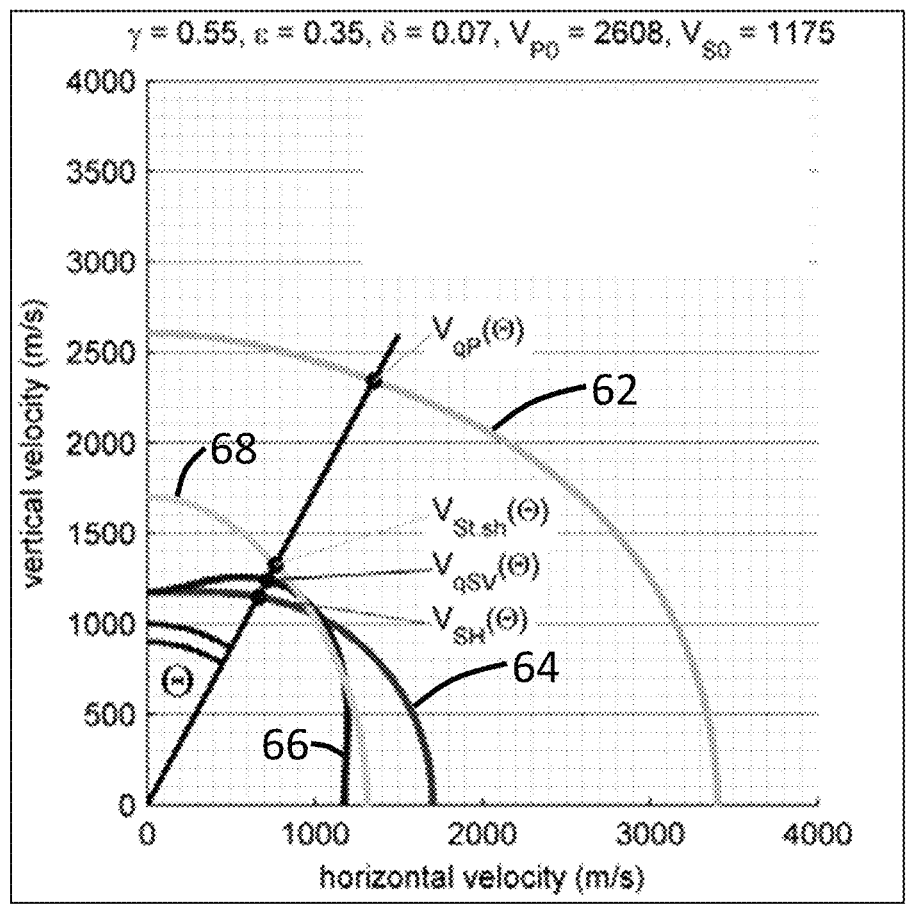
FIG. 6 is a polar plot of elastic wave velocities VP0 and VS0, as a function of propagation direction (apparent dip) based on the Thomsen Parameters, respectively, in accordance with embodiments of the present disclosure.

In the past, Thomsen parameters were derived from two or more boreholes with different well deviations. FIG. 5, for example, is a schematic of a vertical borehole 59 and a deviated borehole 52 in a subterranean formation 50. At least two boreholes with different deviations are needed to make the polar plot. With particular respect to FIG. 6, a polar plot of elastic wave velocities based on VP0, VS0 and propagation angle θ (apparent dip) based on the Thomsen Parameters, respectively, in accordance with embodiments of the present disclosure is shown. The relationship between vertical and horizontal elastic velocities are presented for qP compressional 62, dipole SH shear 64, dipole qSV shear 66, and Stoneley shear 68 wave velocities. For a given propagation angle θ measured with respect to the vertical, velocities can be determined for each of these wave types.

Other approaches have included using a vertical well and a deviated building angle into a horizontal well to derive the Thomsen Parameters. However, previous methods are based on a weak anisotropy approximation.

Figure 7:
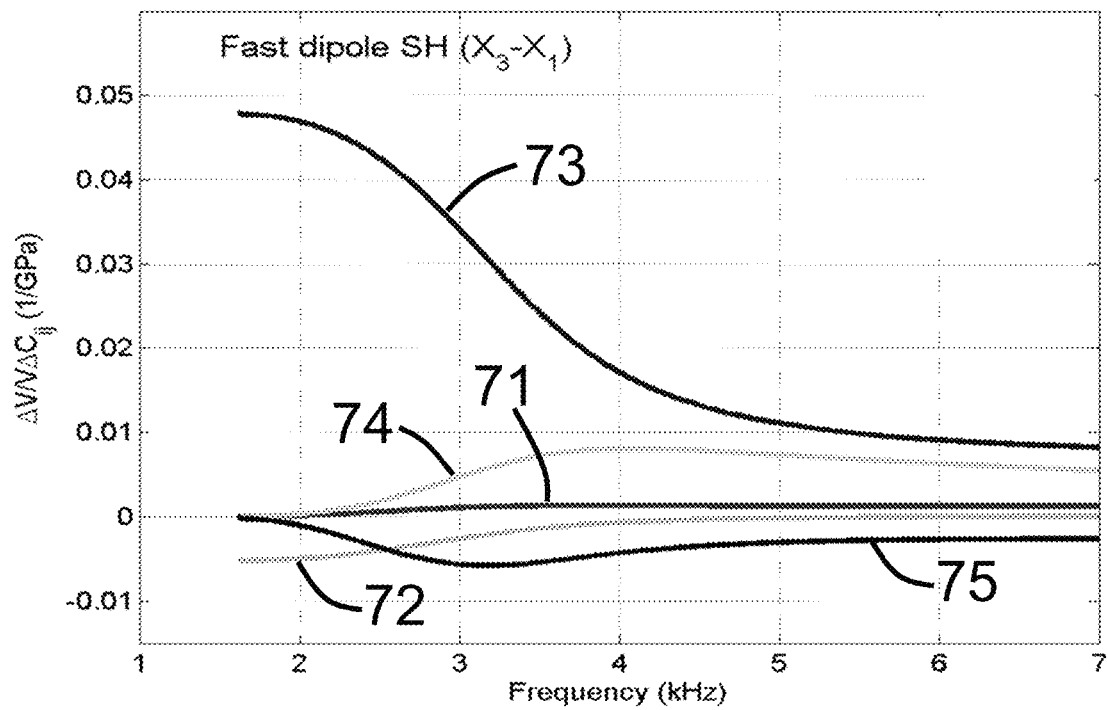
FIG. 7 is a plot of frequency-dependent fractional changes in the fast-dipole flexural velocities per unit changes in the five TI-elastic constants in accordance with embodiments of the present disclosure.

In the scenario presented in FIG. 7, an iterative approach may be taken to invert for the shear and quasi-compressional moduli $C_{ij}$ needed to determine the Thomsen parameters based on the mismatch between the dispersive behavior seen from the log data versus the modeled response assuming a homogeneous formation with no anisotropy, where Cij=[1/(slowness)]²$\rho_b$.

FIG. 7 is a plot of frequency-dependent fractional changes in the fast-dipole flexural velocities per unit changes in the five TI-elastic constants in accordance with embodiments of the present disclosure. The figure plots five sensitivity curves to changes in the TI-elastic constants $\Delta C_{11}$ (71), $\Delta C_{33}$ (72), $\Delta C_{55}$ (73), $\Delta C_{66}$ (74), and $\Delta C_{13}$ (75). For example, sensitivity curve $\Delta C_{55}$ (73) depicts frequency-dependent, fractional change in the fast-dipole flexural velocity caused by a 1 GPa change in $C_{55}$. The other curves are similarly understood.

Estimation of TI-Elastic Constants from Sonic Data

One or more embodiments of the present disclosure describe methods for estimating five TI (Transversely-Isotropic) elastic constants of strongly anisotropic shale formations using borehole sonic data. Borehole sonic data include refracted and reflected plane wave arrivals together with guided modes, such as the Stoneley and cross-dipole flexural waves. A major distinguishing feature of one or more embodiments of the present disclosure is that the proposed workflows are not limited to a weak anisotropy approximation (where the Thomsen parameters may be assumed to be less than unity), as is the case in previous methods. A weak anisotropy approximation may be applied when the Thomsen parameters are less than a value other than unity, for example, 0.5.

One or more embodiments of the present disclosure may provide workflows for estimating all five TI-elastic constants using borehole sonic data acquired from (a) vertical and deviated boreholes; (b) horizontal and deviated boreholes; (c) two boreholes with different deviations; and (d) vertical, horizontal and deviated.

One or more embodiments of the present disclosure may describe a workflow to estimate all five TI-elastic constants using borehole sonic data from a horizontal borehole together with reflection data from a nearby horizontal limestone (or any other stiff stringer) layer. Other examples of stiff stringers include dolomite and anhydrite. In one or more embodiments, the stiff stringer may be located 1 to 4 feet away from the borehole wall. Processing of sonic data from a horizontal borehole parallel to the $X_1$-axis, yields three of the five TI-elastic constants ($C_{11}$, $C_{55}$, and $C_{66}$), whereas the reflection data provide estimates of the remaining two TI-elastic constants ($C_{33}$ and $C_{13}$) together with the distance of the reflector from the borehole surface.

One or more embodiments of the present disclosure may be based on analyzing both refracted and reflected quasi-compressional waves from a nearby horizontal limestone embedded in a thick shale formation. The transmitter and an array of receivers may be placed in a horizontal borehole in the shale formation. Refracted quasi-compressional arrivals from both the shale and proximate stiff, e.g., limestone, layers are obtained from the recorded waveforms. A limestone layer is an example of a proximate stiff layer. In the present disclosure, a limestone layer is understood to be representative of a proximate layer and that other types of formation including dolomite and anhydrite may be substituted. Below are four observations that may be described by four equations to be solved for four unknowns:

(1) A ray-path of the refracted quasi-compressional wave in the proximate stiff layer, e.g., limestone layer, may include a qP-wave in the shale layer propagating at a critical angle $\theta_1$ as described by the Snell's law.

(2) The critical angle $\theta_1$ is also related to the reflector distance D of the limestone layer, or other proximate stiff layer, from the borehole surface, and axial offsets travelled in the shale layer.

(3) The time offset $t_1$ of the limestone arrival from its T-R line is obtained from the STC plot that may be expressed by the time for the ray to travel through the shale layer and is given by the ratio of distance travelled in shale and quasi-P wave velocity at an angle $\theta_1$ from the TI-symmetry axis.

(4) Total travel time $t_2$ of the limestone arrival may be estimated from the STC processing of recorded monopole waveforms for a given T-R spacing $Z_{TR}$. Total time $t_2$ comprises of travel time through the shale layer and travel time through the limestone layer.

In one or more embodiments, a formation layer stiffer than the formation in which the horizontal borehole is located may be used in place of the limestone layer. This layer may be referred to as a proximate stiff layer. The aforementioned four equations may be solved for the unknowns D, $\theta_1$, $V_{qP}(\theta_1)$, and axial offsets $Z_{shale}$ in the shale formation traveled by the refracted wave in the limestone layer. Given a known value of reflector distance D, estimate $V_{qP}^{shale}(\theta)$ in shale from the reflected wave arrivals for a series of T-R spacings from 1 to 7 ft as shown in Table 6. Estimates of $V_{qP}^{shale}(\theta)$ in shale for multiple propagation directions $\theta$ from the TI-symmetry ($X_3$-) axis may then be used to calculate the two Thomsen parameters ε and δ. The Thomsen parameter gamma may be estimated from the difference between the fast and slow shear slownesses from cross-dipole sonic logging data acquired from a horizontal borehole parallel to the $X_1$-axis.

Anisotropic Formations

Most formations exhibit some degree of anisotropy. AVO analysis may require some combinations of formation TI-elastic constants. Some of these TI-elastic constants may be obtained from the borehole sonic measurements, others may be obtained from borehole seismic measurements, such as walk-away VSPs. TI-elastic constants that may be obtained from the borehole sonic measurements are the three formation shear moduli and a quasi-compressional modulus.

The formation shear anisotropy may be caused by aligned fractures, thin beddings or microlayering in shales. This type of anisotropy is called formation intrinsic anisotropy. Non-hydrostatic prestresses in a formation may introduce stress-induced anisotropy. Strictly speaking, stress-induced anisotropy may be properly described by equations of motion for small dynamic fields superposed on a static bias that may be derived from nonlinear continuum mechanics. Based on this theory, it has been demonstrated that a dipole dispersion crossover may be an indicator of stress-induced anisotropy dominating any intrinsic anisotropy that may also be present.

Consider the special case of a borehole with its axis parallel to the $X_3$-axis of an orthorhombic formation. The elastic constants referenced to the borehole axes for an orthorhombic formation takes the form expressed in Eq. (19):

$$C_{ij} = \begin{bmatrix} C_{11} & C_{12} & C_{13} & 0 & 0 & 0 \\ & C_{22} & C_{23} & 0 & 0 & 0 \\ & & C_{33} & 0 & 0 & 0 \\ & & & C_{44} & 0 & 0 \\ & & & & C_{55} & 0 \\ & & & & & C_{66} \end{bmatrix}, \quad (19)$$

where the 9 independent elastic moduli are $C_{11}$, $C_{12}$, $C_{13}$, $C_{22}$, $C_{23}$, $C_{33}$, $C_{44}$, $C_{55}$, and $C_{66}$.

Figure 8:
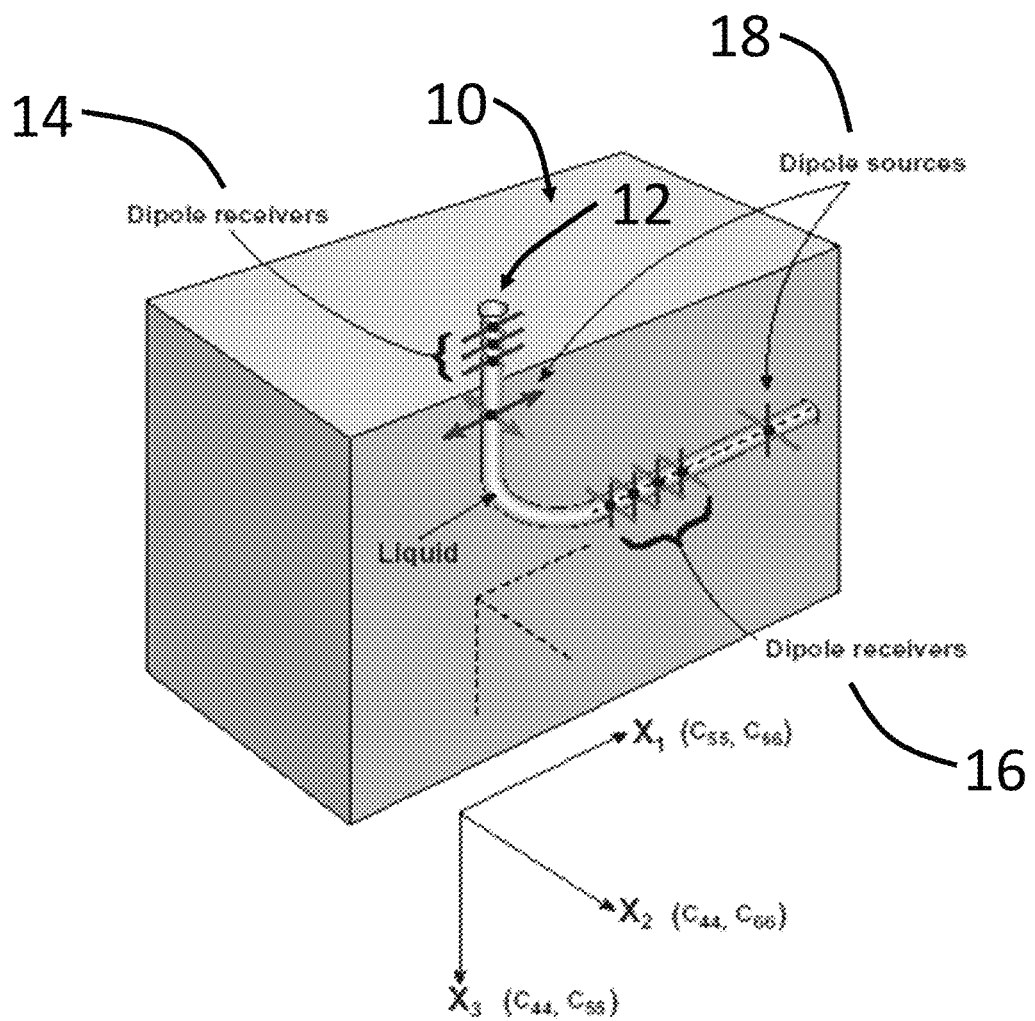
FIG. 8 is a schematic diagram of a vertical well parallel to the $X_3$-axis and a horizontal well parallel to the $X_1$-axis in accordance with embodiments of the present disclosure.

Referring to FIG. 8, a borehole 12 may pass through a portion of a subterranean formation 10. The formation 10 may be a TI-formation. The borehole 12 may be vertical, deviated, or horizontal in orientation and liquid-filled. When the formation 10 is logged using a sonic tool, a plurality of dipole sources 18 and dipole receivers 14, 16 may be present in the borehole.

FIG. 8 shows a schematic diagram of a vertical well with the $X_3$-axis parallel to the borehole 12, and a horizontal section of the well with the $X_1$-axis parallel to the borehole. Cross-dipole data from a well parallel to the $X_3$-axis yields the shear moduli $C_{44}$ and $C_{55}$ in the two orthogonal vertical planes. Similarly, cross-dipole data from a well parallel to the $X_1$-axis yields the shear modulus $C_{55}$ in the vertical $X_1$-$X_3$ plane, and $C_{66}$ in the horizontal $X_1$-$X_2$ planes.

A dipole source in such a borehole may generate two principal flexural waves. Low-frequency asymptotes of these two flexural dispersions yield the two shear wave velocities that provide two of the three shear moduli of the formation. As indicated in FIG. 8, $C_{44}$ and $C_{55}$ are the two shear moduli that may be obtained from the fast and slow dipole flexural dispersions. Note that if the formation were azimuthally isotropic in the $X_1$-$X_2$ plane, then $C_{44}=C_{55}$. This is the case with a transversely isotropic (TI) formation with $X_3$-axis parallel to the TI-symmetry axis. However, the third shear modulus $C_{66}$ is different and may be estimated from the tube wave velocity or from the inversion of Stoneley dispersion over a select bandwidth.

A Deviated Borehole in a TI Formation

Sonic data acquired in deviated boreholes yield formation elastic constants referred to the borehole measurement axes. These elastic constants may be transformed to corresponding TI-elastic constants referred to the earth anisotropy axes. The transformed TI-elastic constants may then be used for a proper interpretation of rock lithology.

Sonic data acquired in boreholes with dipping beds would also yield apparent elastic constants referred to the borehole measurement axes. Measurement of formation true dip together with well deviation yields the relative dip with respect to the borehole axes. Knowing the relative dip with respect to the borehole axis, then enables one to determine real TI-elastic constants referred to the earth anisotropic axes.

Plane Wave Velocities in Deviated Boreholes

If the borehole makes an angle $\theta$ with respect to the TI-symmetry axis, the quasi-compressional headwave velocity $V_{qP}$, the pure shear wave velocity $V_{SH}$, and the quasi-shear wave velocity $V_{qSV}$ may be obtained from the solution of the following Eqs. (20):

$$C_{3jk3}^{\prime} u_{k,33} = \rho \ddot{u}_j, \quad (20)$$

where $C_{ijkl}^{\prime}$ denote rotated TI-elastic constants referred to the deviated borehole axis making an angle $\theta$ with respect to the TI-symmetry $X_3$-axis, $u_j$ is the particle displacement associated with the plane wave propagation, and $\rho$ is the mass density of the propagating medium. The solution for plane wave propagation along the deviated borehole axis may be obtained from the following matrix equation (21):

$$\begin{bmatrix} (C_{55}^{\prime} - \lambda) & 0 & C_{35}^{\prime} \\ 0 & (C_{44}^{\prime} - \lambda) & 0 \\ C_{35}^{\prime} & 0 & (C_{33}^{\prime} - \lambda) \end{bmatrix} \begin{Bmatrix} A_1 \\ A_2 \\ A_3 \end{Bmatrix} = \begin{Bmatrix} 0 \\ 0 \\ 0 \end{Bmatrix}, \quad (21)$$

where $C_{34}^{\prime} = C_{45}^{\prime} = 0$, for a TI-formation. The three plane wave velocities may be obtained from the determinant of the coefficient matrix that must vanish. Two of the eigenvalues may be solved for from the following quadratic equation in $\lambda$ as expressed in Eq. (22):

$$\lambda^2 - (C_{33}^{\prime} + C_{55}^{\prime})\lambda + (C_{33}^{\prime}C_{55}^{\prime} - C_{35}^{\prime 2}) = 0, \quad (22)$$

where the two roots of this quadratic equation may be solved from the following Eqs. (23):

$$\lambda_1 = \frac{C_{55}^{\prime} + C_{33}^{\prime} - \sqrt{(C_{55}^{\prime} + C_{33}^{\prime})^2 - 4(C_{33}^{\prime}C_{55}^{\prime} - C_{35}^{\prime 2})}}{2}, \quad (23)$$

$$\lambda_2 = \frac{C_{55}^{\prime} + C_{33}^{\prime} - \sqrt{(C_{55}^{\prime} + C_{33}^{\prime})^2 - 4(C_{33}^{\prime}C_{55}^{\prime} - C_{35}^{\prime 2})}}{2}.$$

The three eigenvalues corresponding to the three plane wave velocities in Eq. (21) may be given by Eqs. (24):

$$\lambda_1 = \rho V_{qP}^2,$$

$$\lambda_2 = \rho V_{qSV}^2,$$

$$\lambda_3 = \rho V_{SH}^2 = C_{44}^{\prime} = C_{44}^{\prime} = C_{44} \cos^2\theta + C_{66}\sin^2\theta. \quad (24)$$

When estimating the TI-elastic constants from the plane wave velocities, it may be useful to relate the rotated TI-elastic constants to the TI-elastic constants following orthogonal transformation relations for a 4-rank tensor $C_{ijkl}$. Rotated TI-elastic constants in the Voigt's compressed notation may be expressed in terms of TI-elastic constants as shown below as expressed in Eqs. (25):

$$C_{33}^{\prime} = C_{11}\sin^4\theta + C_{33}\cos^4\theta + C_{55}\sin^2 2\theta + 2C_{13}\sin^2\theta\cos^2\theta, \quad (25)$$

$$C_{55}^{\prime} = \frac{1}{8}[2C_{11}\sin^2 2\theta + C_{33}(1 - \cos 4\theta) + 4C_{55}(1 + \cos 4\theta)] - \frac{1}{2}C_{13}\sin^2 2\theta,$$

$$C_{35}^{\prime} = \frac{1}{4}\sin 2\theta[2C_{11}\sin^2\theta - C_{33}(1 + \cos 2\theta) + 4C_{55}\cos 2\theta] + \frac{1}{2}C_{13}\sin 2\theta\cos 2\theta,$$

$$C_{44}^{\prime} = C_{44}\cos^2\theta + C_{66}\sin^2\theta.$$

The sum and product of the two eigenvalues of Eq. (21) may be given by the following Eq. (26)

$$C_{33}^{\prime} + C_{55}^{\prime} = \left(\sin^4\theta + \frac{1}{4}\sin^2 2\theta\right)C_{11} + \left(1 + \cos^4\theta - \frac{1}{8}\cos 4\theta\right)C_{33} +, \quad (26)$$

$$\left(\frac{1}{2} + \frac{1}{2}\cos 4\theta + \sin^2 2\theta\right)C_{55}$$

$$= \rho(V_{qP}^2 + V_{qSV}^2),$$

$$\lambda_1 \lambda_2 = (C_{33}^{\prime}C_{55}^{\prime} - C_{35}^{\prime 2}) = (\rho V_{qP}^2)(\rho V_{qSV}^2).$$

These equations provide closed-form expressions relating the five TI-elastic constants to measured qP, qSV, and SH wave velocities along a deviated borehole that makes an angle $\theta$ with respect to the TI-symmetry axis. Insofar as the SH-wave is a pure shear wave, and qSV-wave is a quasi-shear wave that also has an axial component, one may expect the receiver amplitude of the SH-wave to be larger than that of the qSV-wave as recorded by the hydrophones on the borehole axis.

TI-Elastic Constants from Wells with Different Deviations in Strongly Anisotropic Formations One or more embodiments of the present disclosure may include multiple workflows to estimate all five TI-elastic constants using four different combinations of measured sonic velocities in boreholes with different deviations: (a) vertical and deviated; (b) horizontal and deviated; (c) two different deviations; and (d) vertical, horizontal and deviated.

While steps in one or more embodiments of the present disclosure, may be presented in a particular order, it is understood that other ordering of steps may be possible.

(a) Five TI-Elastic Constants from a Vertical and a Deviated Borehole

Figure 14A:
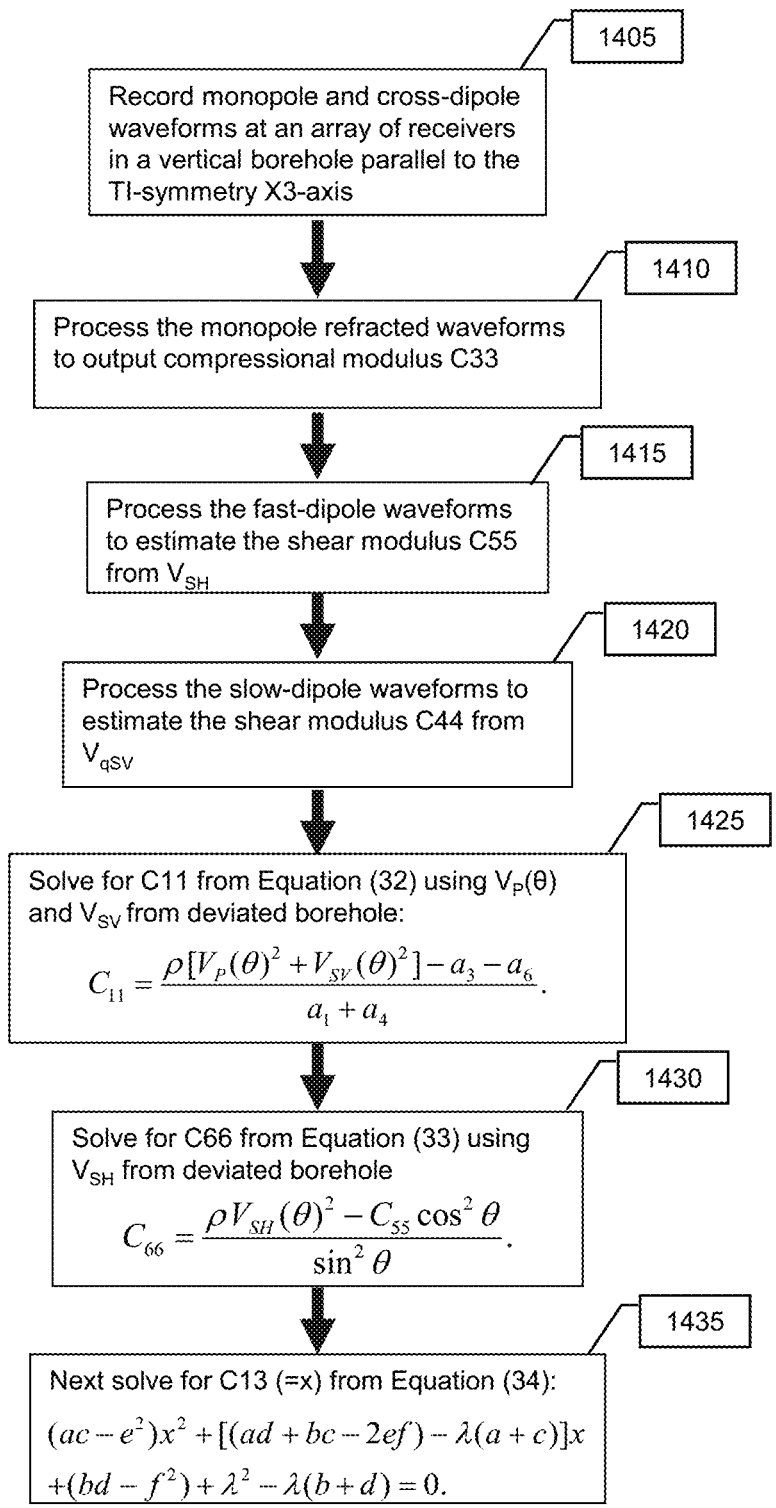
FIG. 14A shows a flowchart for estimating all five TI-elastic constants from sonic data acquired in a vertical borehole and a deviated borehole in accordance with embodiments of the present disclosure.

FIG. 1 shows a schematic diagram of vertical and deviated sections of a well 12 together with the measurement axes. All five TI-elastic constants of a shale formation may be estimated from sonic velocities in vertical and deviated sections of a borehole 12 in a reasonably uniform shale lithology. An embodiment of this method may be seen in the flowchart of FIG. 14A. In one or more embodiments, monopole and cross-dipole waveforms are recorded at an array of receivers in a vertical borehole parallel to the TI-symmetry axis $X_3$ (step 1405). To obtain closed-form expressions for the solution of $C_{13}$, we introduce some new variables as shown below in Eq. (27):

$$C'_{33} = C_{11}\sin^4\theta + C_{33}\cos^4\theta + C_{55}\sin^2 2\theta + 2C_{13}\sin^2\theta\cos^2\theta, \quad (27)$$
$$= ax + b,$$
$$C'_{55} = \frac{1}{8}[2C_{11}\sin^2 2\theta + C_{33}(1-\cos 4\theta) + 4C_{55}(1+\cos 4\theta)] - \frac{1}{2}C_{13}\sin^2 2\theta,$$
$$= cx + d,$$
$$C'_{35} = \frac{1}{4}\sin 2\theta[2C_{11}\sin^2\theta - C_{33}(1+\cos 2\theta) + 4C_{55}\cos 2\theta] + \frac{1}{2}C_{13}\sin 2\theta\cos 2\theta,$$
$$= ex + f,$$

where, as expressed in Eqs. (28):

$$a = 2\sin^2\theta\cos^2\theta, \quad (28)$$
$$b = C_{11}\sin^4\theta + C_{33}\cos^4\theta + C_{55}\sin^2 2\theta,$$
$$c = -\frac{1}{2}\sin^2 2\theta,$$
$$d = \frac{1}{8}[2C_{11}\sin^2 2\theta + C_{33}(1-\cos 4\theta) + 4C_{55}(1+\cos 4\theta)],$$
$$e = \frac{1}{2}\sin 2\theta\cos 2\theta,$$
$$f = \frac{1}{4}\sin 2\theta[2C_{11}\sin^2\theta - C_{33}(1+\cos 2\theta) + 4C_{55}\cos 2\theta],$$
$$x = C_{13}.$$

Eqs. (27) together with (28) may be substituted into (23) to solve for $C_{13}$ when $C_{11}$, $C_{33}$, and $C_{55}$ are known from other sources.

(1) Vertical Borehole Parallel to the TI-Symmetry Axis

Compressional and shear wave velocities along a vertical borehole parallel to the TI-symmetry axis yield the compressional modulus $C_{33}$ and shear modulus $C_{44}(=C_{55})$ as shown below in Eqs. (29) and seen in steps 1410, 1415, and 1420:

$$C_{33} = \rho V_P^2,$$
$$C_{44} = C_{55} = \rho V_{SH}^2 = \rho V_{SV}^2, \quad (29)$$

where the compressional wave velocity $V_P$ may be obtained from the DTCo log, and the cross-dipole shear logs may provide $V_{SH}$ and/or $V_{SV}$.

(2) Deviated Borehole with Dip $\theta$ Relative to the TI-Symmetry $X_3$-Axis

Next one may write rotated TI-elastic constants referred to the deviated borehole axes (denoted by primed superscript) that may be related to the measured qP, qSV, and SH wave velocities. These relations are given by the following Eqs. (30):

(30)

$$C'_{33} = C_{11}\sin^4\theta + C_{33}\cos^4\theta + C_{55}\sin^2 2\theta + 2C_{13}\sin^2\theta\cos^2\theta,$$
$$= a_1 C_{11} + a_2 C_{13} + a_3,$$
$$C'_{55} = \frac{1}{8}[2C_{11}\sin^2 2\theta + C_{33}(1-\cos 4\theta) + 4C_{55}(1+\cos 4\theta)] - \frac{1}{2}C_{13}\sin^2 2\theta,$$
$$= a_4 C_{11} + a_5 C_{13} + a_6,$$
$$C'_{35} = \frac{1}{4}\sin 2\theta[2C_{11}\sin^2\theta - C_{33}(1+\cos 2\theta) + 4C_{55}\cos 2\theta] + \frac{1}{2}C_{13}\sin 2\theta\cos 2\theta,$$
$$= a_7 C_{11} + a_8 C_{13} + a_9,$$

where, as expressed in Eqs. (31):

$$a_1 = \sin^4\theta, \quad (31)$$
$$a_2 = \frac{1}{2}\sin^2 2\theta,$$
$$a_3 = \cos^4\theta C_{33} + \sin^2 2\theta C_{55},$$
$$a_4 = \frac{1}{4}\sin^2 2\theta,$$
$$a_5 = -\frac{1}{2}\sin^2 2\theta,$$
$$a_6 = \frac{1}{8}(1-\cos 4\theta)C_{33} + \frac{1}{2}(1+\cos 4\theta)C_{55},$$
$$a_7 = \frac{1}{2}\sin 2\theta \sin^2\theta,$$
$$a_8 = \frac{1}{4}\sin 4\theta,$$
$$a_9 = -\frac{1}{4}\sin 2\theta(1+\cos 2\theta)C_{33} + \sin 2\theta \cos 2\theta C_{55}.$$

Since ($a_2 + a_5 = 0$), one may solve for $C_{11}$ from the following Eq. (32) that has been derived from Eq. (26) as seen in step 1425:

$$C_{11} = \frac{\rho[V_{qP}(\theta)^2 + V_{qSV}(\theta)^2] - a_3 - a_6}{a_1 + a_4}. \quad (32)$$

At this point, we have already solved for $C_{33}$, $C_{55}$, and $C_{11}$. Next one may estimate $C_{66}$ from the following Eq. (33) obtained from Eq. (24) as seen in step 1430:

$$C_{66} = \frac{\rho V_{SH}(\theta)^2 - C_{55}\cos^2\theta}{\sin^2\theta}. \quad (33)$$

Solution for C13

Finally, one may solve for $C_{13}$ from the following quadratic Eq. (34) as seen in step 1435. Eq. (34) has been obtained from Eq. (23) after substituting for rotated TI-elastic constants in terms of TI-elastic constants as shown in Eqs. (27) and (28). This quadratic equation (34) does not require any lengthy search for a minima of a cost function $$(ac-e^2)x^2 + [(ad+bc-2ef) - \lambda(a+c)]x + (bd-f^2) + \lambda^2 - \lambda(b+d) = 0, \quad (34)$$

where, as expressed in Eqs. (35):

$$a = 2\sin^2\theta\cos^2\theta, \quad (35)$$
$$b = C_{11}\sin^4\theta + C_{33}\cos^4\theta + C_{55}\sin^2 2\theta,$$
$$c = -\frac{1}{2}\sin^2 2\theta,$$
$$d = \frac{1}{8}[2C_{11}\sin^2 2\theta + C_{33}(1-\cos 4\theta) + 4C_{55}(1+\cos 4\theta)],$$
$$e = \frac{1}{2}\sin 2\theta\cos 2\theta,$$
$$f = \frac{1}{4}\sin 2\theta[2C_{11}\sin^2\theta - C_{33}(1+\cos 2\theta) + 4C_{55}\cos 2\theta],$$
$$x = C_{13},$$
$$\lambda = \rho V_P(\theta)^2 \text{ or } \rho V_{SV}(\theta)^2.$$

One or more embodiments of a method obtain the five TI-elastic constants from sonic data acquired in a vertical and a deviated borehole.

(b) Five TI-Elastic Constants from a Horizontal and a Deviated Borehole

1. Horizontal Borehole Perpendicular to the TI-Symmetry Axis

Figure 14B:
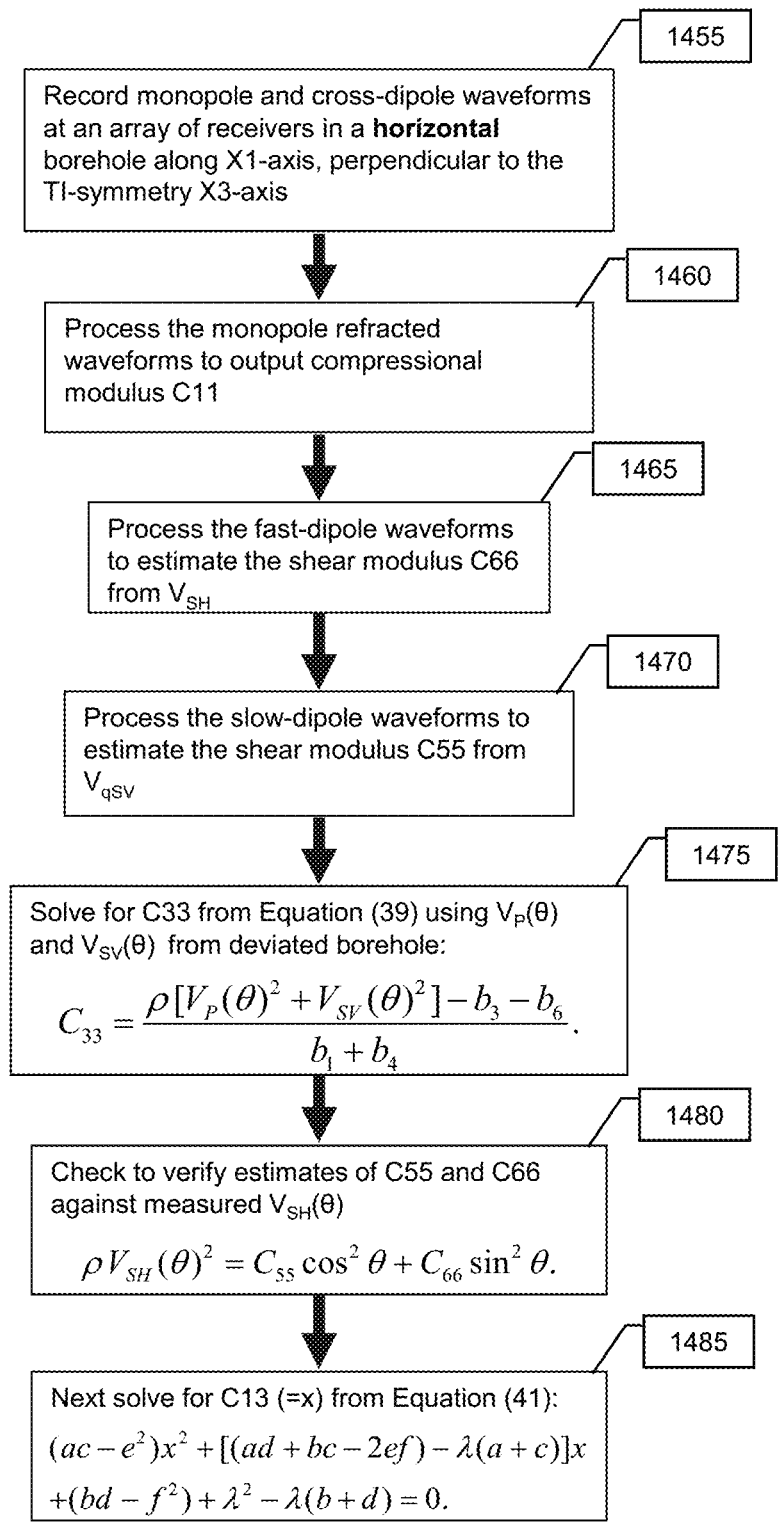
FIG. 14B shows a flowchart for estimating all five TI-elastic constants from sonic data acquired in a horizontal borehole and a deviated borehole in accordance with embodiments of the present disclosure.

Referring to FIG. 14B, in one or more embodiments, monopole and cross-dipole waveforms are recorded at an array of receivers in a horizontal borehole parallel to the $X_1$-axis and perpendicular to the TI-symmetry axis $X_3$ (step 1455).

Consider a horizontal borehole parallel to the $X_1$-axis, and perpendicular to the TI-symmetry $X_3$-axis. Compressional $V_P$, and cross-dipole shear wave velocities $V_{SH}$ and $V_{SV}$ yield three of the five TI-elastic constants as given by the following three Eqs. (36) as seen in steps 1460, 1465, and 1470:

$$C_{11} = \rho V_P^2,$$
$$C_{55} = \rho V_{qSV}^2,$$
$$C_{66} = \rho V_{SH}^2 \quad (36)$$

2. Deviated Borehole with Dip θ Relative to the TI-Symmetry $X_3$-Axis

Next one may invert the quasi-compressional and two shear wave velocities measured with respect to the deviated borehole axis to estimate the compressional modulus $C_{33}$ and $C_{13}$. To this end, one may write the rotated TI-elastic constants referred to the deviated borehole axes (denoted by primed superscript) that can be related to the measured qP, qSV, and SH wave velocities. These relations may be given by the following Eqs. (37):

$$\begin{aligned}
C'_{33} &= C_{11}\sin^4\theta + C_{33}\cos^4\theta + C_{55}\sin^2 2\theta + 2C_{13}\sin^2\theta\cos^2\theta, \\
&= b_1 C_{33} + b_2 C_{13} + b_3, \\
C'_{55} &= \tfrac{1}{8}[2C_{11}\sin^2 2\theta + C_{33}(1-\cos 4\theta) + 4C_{55}(1+\cos 4\theta)] - \tfrac{1}{2}C_{13}\sin^2\theta, \\
&= b_4 C_{11} + b_5 C_{13} + b_6, \\
C'_{35} &= \tfrac{1}{4}\sin 2\theta[2C_{11}\sin^2\theta - C_{33}(1+\cos 2\theta) + 4C_{55}\cos 2\theta] + \tfrac{1}{2}C_{13}\sin 2\theta\cos 2\theta, \\
&= b_7 C_{33} + b_8 C_{13} + b_9,
\end{aligned} \quad (37)$$

where, as expressed in Eqs. (38):

$$\begin{aligned}
b_1 &= \cos^4\theta, \\
b_2 &= \tfrac{1}{2}\sin^2 2\theta, \\
b_3 &= \sin^4\theta C_{11} + \sin^2 2\theta C_{55}, \\
b_4 &= \tfrac{1}{8}(1 - \cos 4\theta), \\
b_5 &= -\tfrac{1}{2}\sin^2 2\theta, \\
b_6 &= \tfrac{1}{4}\sin^2 2\theta C_{11} + \tfrac{1}{2}(1+\cos 4\theta)C_{55}, \\
b_7 &= -\tfrac{1}{4}\sin 2\theta(1+\cos 2\theta), \\
b_8 &= \tfrac{1}{4}\sin 4\theta, \\
b_9 &= \tfrac{1}{2}\sin^2\theta\sin 2\theta C_{11} + \sin 2\theta\cos 2\theta C_{55}.
\end{aligned} \quad (38)$$

One may now solve for $C_{33}$ from the measured quasi-compressional qP and quasi-shear qSV wave velocities parallel to the deviated borehole axis from the following Eq. (39) obtained from Eq. (26) and seen in step 1475:

$$C_{33} = \frac{\rho[V_{qP}(\theta)^2 + V_{qSV}(\theta)^2] - b_3 - b_6}{b_1 + b_4}. \quad (39)$$

Since $C_{55}$ and $C_{66}$ may be known from the cross-dipole shear wave velocities from a horizontal borehole, and $V_{SH}(\theta)$ is measured with respect to the deviated borehole axis, one may use the following equation as a consistency check as shown in step 1480. $V_{SH}(\theta)$ explicitly recognizes that $V_{SH}$ may be a function of propagation direction measured from the TI-symmetry axis. The propagation direction is the same as the borehole axis orientation from the TI-symmetry axis. This equation may also be used to confirm that qSV and SH wave velocities measured from a deviated borehole have been properly labeled using the following Eq. (40) re-written from Eq. (24)

$$\rho V_{SH}(\theta)^2 = C_{55}\cos^2\theta + C_{66}\sin^2\theta. \quad (40)$$

Solution for C13

Finally, one may solve for $C_{13}$ from the following quadratic equation (41) that does not require any lengthy search for a minima of a cost function as shown in step 1485:

$$(ac - e^2)x^2 + [(ad + bc - 2ef) - \lambda(a+c)]x + (bd - f^2) + \lambda^2 - \lambda(b+d) = 0, \quad (41)$$

where, as expressed in Eqs. (42):

$$\begin{aligned}
a &= 2\sin^2\theta\cos^2\theta, \\
b &= C_{11}\sin^4\theta + C_{33}\cos^4\theta + C_{55}\sin^2 2\theta, \\
c &= -\tfrac{1}{2}\sin^2 2\theta, \\
d &= \tfrac{1}{8}[2C_{11}\sin^2 2\theta + C_{33}(1-\cos 4\theta) + 4C_{55}(1+\cos 4\theta)], \\
e &= \tfrac{1}{2}\sin 2\theta\cos 2\theta, \\
f &= \tfrac{1}{4}\sin 2\theta[2C_{11}\sin^2\theta - C_{33}(1+\cos 2\theta) + 4C_{55}\cos 2\theta], \\
x &= C_{13}, \\
\lambda &= \rho V_{qP}(\theta)^2 \text{ or } \rho V_{qSV}(\theta)^2.
\end{aligned} \quad (42)$$

Eq. (41) has been re-written from Eq. (23) in terms of new variables that enables a solution of $C_{13}$ from a quadratic equation.

Figure 15:
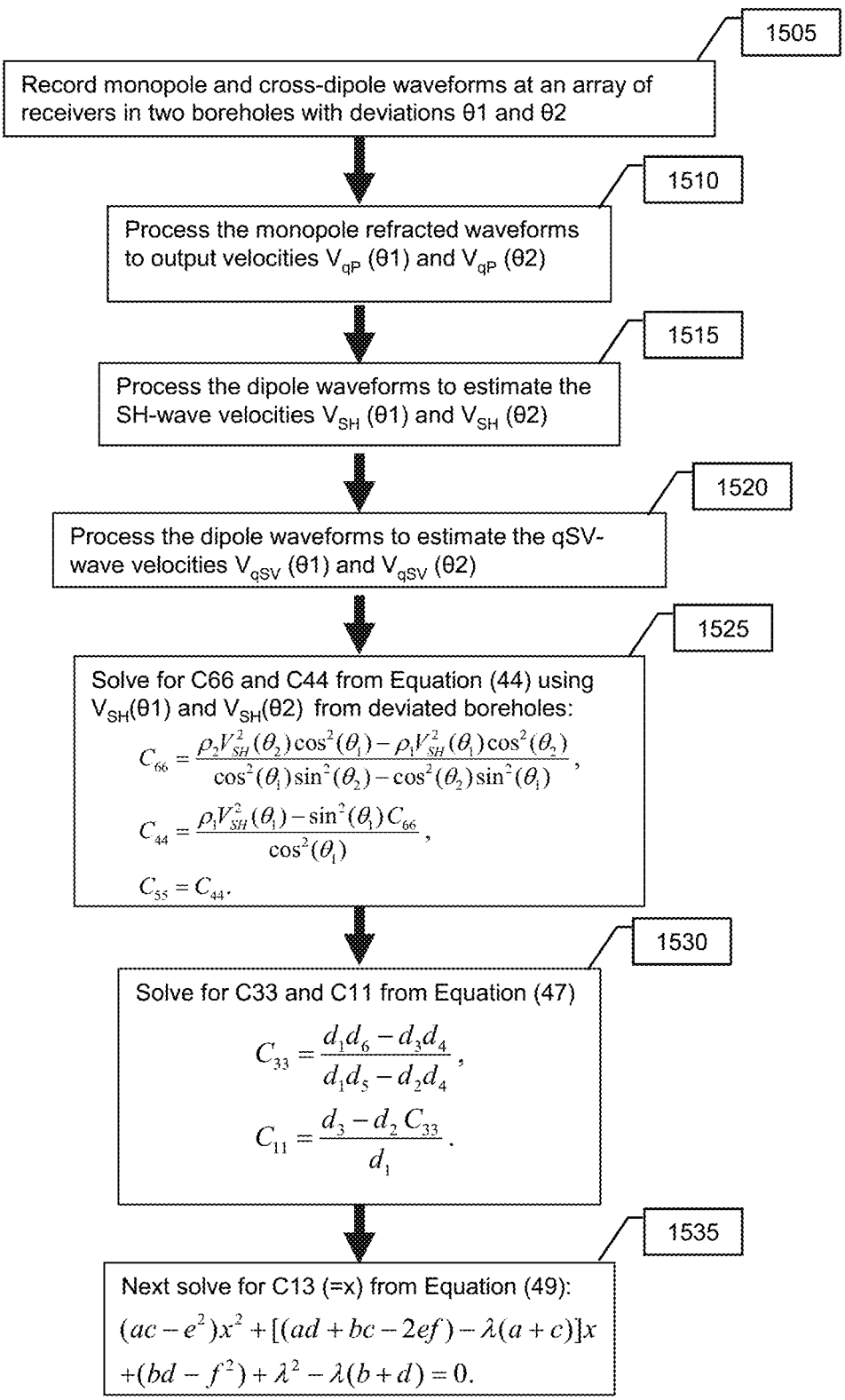
FIG. 15 shows a flowchart for estimating all five TI-elastic constants from sonic data acquired in two boreholes with different deviations $\theta_1$ and $\theta_2$ in accordance with embodiments of the present disclosure.

(c) Five TI-Elastic Constants from Three Sonic Velocities in Two Deviated Boreholes When one has quasi-compressional $V_{qP}$, quasi-shear $V_{qSV}$, and shear $V_{SH}$ velocities in two wells with different deviations or relative dips $\theta_1$ and $\theta_2$ in the same lithology interval, one may compute all five TI-elastic constants even in the absence of Stoneley data. An embodiment in accordance with the present disclosure may be seen in FIG. 15. Monopole and cross-dipole waveforms may be recorded at an array of receivers in two boreholes with deviations $\theta_1$ and $\theta_2$ (step 1505).

Solve for $C_{66}$ and $C_{44}$:

One may then process the monopole refracted waveforms to output velocities $V_{qP}(\theta_1)$ and $V_{qP}(\theta_2)$ as seen in step 1510. One may process the dipole waveforms to estimate the SH-wave velocities $V_{SH}(\theta_1)$ and $V_{SH}(\theta_2)$ as seen in step 1515. Further, one may process the dipole waveforms to estimate the qSV wave velocities $V_{qSV}(\theta_1)$ and $V_{qSV}(\theta_2)$ as seen in step 1520. If the borehole makes an angle $\theta_1$ and $\theta_2$ with respect to the TI-symmetry axis, the shear (SH) velocity $V_{SH}(\theta_1)$ and $V_{SH}(\theta_2)$ are related to the TI-elastic constants $C_{44}$ and $C_{66}$ by the following Eqs. (43):

$$\rho_1 V_{SH}(\theta_1)^2 = C_{44}\cos^2\theta_1 + C_{66}\sin^2\theta_1,$$

$$\rho_2 V_{SH}(\theta_2)^2 = C_{44}\cos^2\theta_2 + C_{66}\sin^2\theta_2. \quad (43)$$

One may solve these two simultaneous equations for $C_{66}$ and $C_{44}$ and express them by the following two Eqs. (44) and seen in step 1525:

$$C_{66} = \frac{\rho_2 V_{SH}^2(\theta_2)\cos^2(\theta_1) - \rho_1 V_{SH}^2(\theta_1)\cos^2(\theta_2)}{\cos^2(\theta_1)\sin^2(\theta_2) - \cos^2(\theta_2)\sin^2(\theta_1)}, \quad (44)$$

$$C_{44} = \frac{\rho_1 V_{SH}^2(\theta_1) - \sin^2(\theta_1)C_{66}}{\cos^2(\theta_1)},$$

$$C_{55} = C_{44}.$$

Solve for $C_{33}$ and $C_{11}$:

Since the shear modulus $C_{44}$ or $C_{55}$ is now known, one may use the following Eq. (45) valid for the two borehole deviations of $\theta=\theta_1$ or $\theta_2$, with respect to the borehole axis to compute the TI-elastic constants $C_{11}$ and $C_{33}$.

$$\rho(V_{qP}^2 + V_{qSV}^2) = \left(\sin^4\theta + \frac{1}{4}\sin^2 2\theta\right)C_{11} + \quad (45)$$

$$\left(1 + \cos^4\theta - \frac{1}{8}\cos 4\theta\right)C_{33} + \left(\frac{1}{2} + \frac{1}{2}\cos 4\theta + \sin^2 2\theta\right)C_{55}.$$

We may form the following two simultaneous Eqs. (46) in $C_{11}$ and $C_{33}$ $$d_1 C_{11} + d_2 C_{33} = d_3,$$

$$d_4 C_{11} + d_5 C_{33} = d_6, \quad (46)$$

and the solution for $C_{33}$ and $C_{11}$ may be expressed as shown below in Eqs. (47) as seen in step 1530:

$$C_{33} = \frac{d_1 d_6 - d_3 d_4}{d_1 d_5 - d_2 d_4}, \quad (47)$$

$$C_{11} = \frac{d_3 - d_2 C_{33}}{d_1}.$$

where, as expressed in Eqs. (48):

(48)

$$d_1 = \sin^4\theta_1 + \frac{1}{4}\sin^2(2\theta_1),$$

$$d_2 = \cos^4(\theta_1) + \frac{1}{8}(1 - \cos 4\theta_1),$$

$$d_3 = \rho_1[V_P^2(\theta_1) + V_{SV}^2(\theta_1)] - \left[\sin^2(2\theta_1) + \frac{1}{2}(1 + \cos 4\theta_1)\right]C_{55},$$

$$d_4 = \sin^4\theta_2 + \frac{1}{4}\sin^2(2\theta_2),$$

$$d_5 = \cos^4(\theta_2) + \frac{1}{8}(1 - \cos 4\theta_2),$$

$$d_6 = \rho_2[V_P^2(\theta_2) + V_{SV}^2(\theta_2)] - \left[\sin^2(2\theta_2) + \frac{1}{2}(1 + \cos 4\theta_2)\right]C_{55}.$$

Solve for $C_{13}$:

Finally, one may solve for $C_{13}$ from the following quadratic Eq. (49) that does not require any lengthy search for a minima of a cost function as seen in step 1535:

$$(ac - e^2)x^2 + [(ad + bc - 2ef) - \lambda(a+c)]x + (bd - f^2) + \lambda^2 - \lambda(b + d) = 0, \quad (49)$$

where, as expressed in Eqs. (50):

$$a = 2\sin^2\theta\cos^2\theta, \quad (50)$$

$$b = C_{11}\sin^4\theta + C_{33}\cos^4\theta + C_{55}\sin^2 2\theta,$$

$$c = -\frac{1}{2}\sin^2 2\theta,$$

$$d = \frac{1}{8}[2C_{11}\sin^2 2\theta + C_{33}(1 - \cos 4\theta) + 4C_{55}(1 + \cos 4\theta)],$$

$$e = \frac{1}{2}\sin 2\theta\cos 2\theta,$$

$$f = \frac{1}{4}\sin 2\theta[2C_{11}\sin^2\theta - C_{33}(1 + \cos 2\theta) + 4C_{55}\cos 2\theta],$$

$$x = C_{13},$$

$$\lambda = \rho V_P(\theta)^2 \text{ or } \rho V_{SV}(\theta)^2.$$

Eq. (49) has been re-written from Eq. (23) in terms of new variables that provides a closed-form solution of $C_{13}$ from a quadratic equation.

Figure 18:
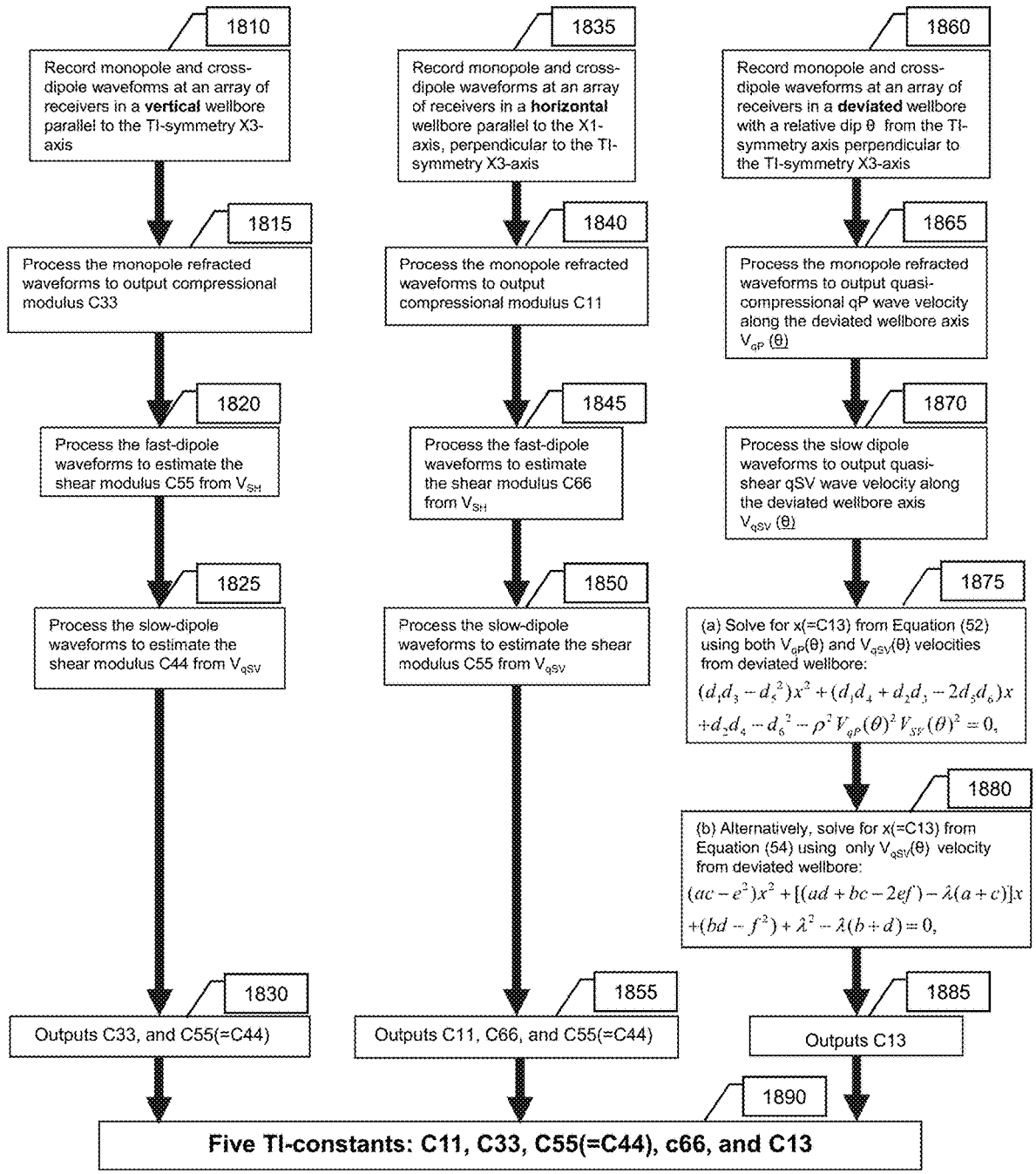
FIG. 18 shows a flowchart for estimating all five TI-elastic constants from sonic data acquired in a vertical borehole, a horizontal borehole, and a deviated borehole in accordance with embodiments of the present disclosure.

(d) Five TI-Elastic Constants from a Vertical, a Horizontal and a Deviated Borehole In one or more embodiments, the five TI-elastic constants may be determined from a vertical, a horizontal, and a deviated borehole. An embodiment in accordance with the present disclosure may be seen in FIG. 18. Quasi-compressional $V_{qP}$, quasi-shear qSV and shear SH wave velocities from a vertical borehole parallel to the TI-symmetry $X_3$-axis may be used to calculate $C_{33}$ and $C_{44}$ (steps 1810, 1815, 1820, 1825, and 1830). In addition, quasi-compressional $V_{qP}$ and qSV, and SH wave velocities from a horizontal borehole parallel to the $X_1$-axis and perpendicular to the TI-symmetry axis, provide estimates of $C_{11}$, $C_{55}$, and $C_{66}$, respectively (steps 1835, 1840, 1845, 1850, and 1855). At this point, the only remaining TI-elastic constant to be determined is $C_{13}$ that may be estimated from the quasi-compressional and qSV wave velocities along a deviated borehole that has a relative dip of $\theta$ with respect to the borehole axis (steps 1860, 1865, and 1870).

Solve for C13:

Below are two different algorithms that may be used to estimate the TI-elastic constant $C_{13}$ from the deviated borehole sonic data:

There are two different ways to estimate $C_{13}$ when the other four TI-elastic constants are known from the vertical and horizontal borehole sections in the same lithology interval. Next we describe two different quadratic equations in $C_{13}$. The first quadratic equation requires to input both the $V_{qP}$ and $V_{qSV}$ velocities.

a. Recall that One May Express the Product of the Two Eigenvalues as Given by Eq. (51):

$$\lambda_1\lambda_2 = (C'_{33}C'_{55} - C'^2_{35}) = (\rho V_{qP}^2)(\rho V_{qSV}^2), \quad (51)$$

where the rotated $C'_{33}$, $C'_{55}$, and $C'_{35}$ must now be expressed in terms of the five TI-elastic constants and the relative dip of the deviated borehole axis.

Substituting for the rotated $C'_{33}$, $C'_{55}$, and $C'_{35}$ in terms of the TI-elastic constants and relative dip $\theta$ from the TI-symmetry axis, as shown in step 1875, one may solve for the remaining unknown $C_{13}$ from the following quadratic equation (52):

$$(d_1d_3-d_{52})x^2+(d_1d_4+d_2d_3-2d_5d_6)x+d_2d_4-d_6^2-\rho^2V_P(\theta)^2V_{SV}(\theta)^2=0, \quad (52)$$

where, as expressed in Eqs. (53):

$$d_1 = 2\sin^2\theta\cos^2\theta, \quad (53)$$

$$d_2 = C_{11}\sin^4\theta + C_{33}\cos^4\theta + C_{55}\sin^2 2\theta,$$

$$d_3 = -\frac{1}{2}\sin^2 2\theta,$$

$$d_4 = \frac{1}{8}[2C_{11}\sin^2 2\theta + C_{33}(1-\cos 4\theta) + 4C_{55}(1+\cos 4\theta)],$$

$$d_5 = \frac{1}{2}\sin 2\theta\cos 2\theta,$$

$$d_6 = \frac{1}{4}\sin 2\theta[2C_{11}\sin^2\theta - C_{33}(1+\cos 2\theta) + 4C_{55}\cos 2\theta],$$

$$x = C_{13}.$$

Solve the above quadratic equation in $C_{13}$ using both the qP and qSV wave velocities measured along the deviated borehole axis.

(b) Alternatively, as shown in step 1880, one may also solve for C13 from a quadratic equation (54) shown below after the other four TI-elastic constants ($C_{11}$, $C_{33}$, $C_{55}$, and $C_{66}$) are known in the lithology interval of interest.

$$(ac-e^2)x^2+[(ad+bc-2ef)-\lambda(a+c)]x+(bd-f^2)+\lambda^2-\lambda(b+d)=0, \quad (54)$$

where, as expressed in Eqs. (55):

$$a = 2\sin^2\theta\cos^2\theta, \quad (55)$$

$$b = C_{11}\sin^4\theta + C_{33}\cos^4\theta + C_{55}\sin^2 2\theta,$$

$$c = -\frac{1}{2}\sin^2 2\theta,$$

$$d = \frac{1}{8}[2C_{11}\sin^2 2\theta + C_{33}(1-\cos 4\theta) + 4C_{55}(1+\cos 4\theta)],$$

$$e = \frac{1}{2}\sin 2\theta\cos 2\theta,$$

$$f = \frac{1}{4}\sin 2\theta[2C_{11}\sin^2\theta - C_{33}(1+\cos 2\theta) + 4C_{55}\cos 2\theta],$$

$$x = C_{13},$$

$$\lambda = \rho V_P(\theta)^2 \text{ or } \rho V_{SV}(\theta)^2.$$

One may solve the above quadratic equation in $C_{13}$ using either qP or qSV wave velocity measured along the deviated borehole axis. One way to estimate $C_{13}$ may be to use only the qSV wave velocity from the deviated borehole section to minimize the tool eccentering effects on the quasi-compressional qP-wave velocity.

Thus, shown in steps 1830, 1855, 1885, and 1890, one may obtain all five TI-elastic constants in a depth interval with a reasonably uniform lithology from sonic data acquired in two boreholes with different relative dips caused by changes in the borehole deviations. This procedure may be used in the absence of any Stoneley data that requires an accurate estimate of mud compressional wave slowness ($DT_{mud}$).

Theoretical Validation of Inversion Algorithms

At this point it may be instructive to review plane wave phase velocity variations as a function of propagation direction $\theta$ from the TI-symmetry axis. This angle $\theta$ from the symmetry axis is the same as the relative dip of formation bedding from the borehole axis. FIG. 1 shows schematic diagram of a vertical borehole parallel to the $X_3$-axis and a deviated borehole defined in terms of the azimuth $\phi$ from the North and deviation $\theta$ from the vertical.

Both the monopole and dipole sonic waveforms recorded at an array of receivers may be processed by a modified matrix pencil algorithm that isolates non-dispersive and dispersive arrivals in the wave train. Sonic measurements from a borehole parallel to the $X_3$-axis provide four different slownesses corresponding to: compressional modulus ($C_{33}$), fast and slow dipole shear moduli ($C_{44}$ and $C_{55}$) and Stoneley horizontal shear modulus ($C_{66}$) that may help to estimate three formation shear moduli and a compressional modulus of an orthorhombic formation using the far-field sonic velocities.

Differences between the three shear moduli may help to determine the type of anisotropy. For example, in a reservoir in the presence of horizontal fluid mobility, $C_{66}$ obtained by Stoneley may be somewhat smaller than $C_{44}$ from dipole. In a shaly formation, $C_{66}$ is larger than $C_{44}$. In addition, $C_{66}$ smaller than $C_{44}$ in a sandy formation might be also caused by vertical stress being larger than the horizontal stress.

Theoretical validation results are presented for only moderately anisotropic Bakken shale formation. Nevertheless, we have obtained similar validation results for Austin chalk and Cotton valley shale formations as well. These formations are less anisotropic than Bakken shale and weak anisotropy approximation may be also valid for such formations.

Table 2 contains phase velocities of the qP, qSV, and SH waves as a function of propagation direction, i.e., well deviation, from the TI-symmetry $X_3$-axis. These velocities have been obtained from the three eigenvalues of Eq. (9).

TABLE 2

Bakken shale: Input velocities from Christoffel's equations

| Well deviation (deg) | $V_P$ (m/s) | $V_{SH}$ (m/s) | $V_{SV}$ (m/s) |
| --- | --- | --- | --- |
| 0 | 3473.15 | 2169.91 | 2169.91 |
| 15 | 3500.60 | 2202.89 | 2222.08 |
| 20 | 3525.19 | 2227.18 | 2253.60 |
| 30 | 3606.56 | 2290.55 | 2309.44 |
| 45 | 3807.25 | 2405.15 | 2327.05 |
| 90 | 4282.32 | 2619.35 | 2169.91 |

Table 3 contains a summary of comparison of the inverted TI-elastic constants using phase velocities of the qP, qSV, and SH waves from two boreholes with different deviations. These synthetic velocities have been obtained from the three eigenvalues of Eq. (9), and are listed in Table 2. Excellent agreement between the inverted and actual TI-elastic constants confirms the validity of the proposed workflow.

TABLE 3

Bakken shale: Comparison of inverted and actual TI-elastic constants

| Well deviations used | $C_{11}$ (GPa) | $C_{33}$ (GPa) | $C_{13}$ (GPa) | $C_{44}$ (GPa) | $C_{66}$ (GPa) |
| --- | --- | --- | --- | --- | --- |
| 15 and 45 degrees | 40.9 | 26.9 | 8.5 | 10.5 | 15.3 |

TABLE 3-continued

Bakken shale: Comparison of inverted
and actual TI-elastic constants

| Well deviations used | $C_{11}$ (GPa) | $C_{33}$ (GPa) | $C_{13}$ (GPa) | $C_{44}$ (GPa) | $C_{66}$ (GPa) |
|---|---|---|---|---|---|
| 20 and 45 degrees | 40.9 | 26.9 | 8.5 | 10.5 | 15.3 |
| 15 and 30 degrees | 40.9 | 26.9 | 8.5 | 10.5 | 15.3 |
| Actual TI-constants | 40.9 | 26.9 | 8.5 | 10.50 | 15.30 |

Next, we compare inverted TI-elastic constants with the actual ones using synthetic phase velocities from a vertical (deviation=0 degree) and deviated boreholes. All different combinations of vertical and deviated boreholes yield TI-elastic constants remarkably close to the actual TI-elastic constants as shown in Table 4a. Hence, we have again validated the proposed workflow of inverting velocity data from a vertical and a deviated borehole.

TABLE 4a

Bakken shale: Comparison of inverted and actual
TI-elastic constants (vertical and deviated)

| Well deviations used | $C_{11}$ (GPa) | $C_{33}$ (GPa) | $C_{13}$ (GPa) | $C_{44}$ (GPa) | $C_{66}$ (GPa) |
|---|---|---|---|---|---|
| 0 and 15 degrees | 40.9 | 26.9 | 8.5 | 10.50 | 15.30 |
| 0 and 20 degrees | 40.9 | 26.9 | 8.5 | 10.50 | 15.301 |
| 0 and 30 degrees | 40.9 | 26.9 | 8.5 | 10.50 | 15.30 |
| 0 and 45 degrees | 40.9 | 26.9 | 8.5 | 10.5 | 15.3 |
| Actual TI-constants | 40.9 | 26.9 | 8.5 | 10.50 | 15.30 |

In another illustrative example, we compare inverted TI-elastic constants with the actual ones using synthetic phase velocities from a horizontal (deviation=90 degree) and deviated boreholes. All different combinations of horizontal and deviated boreholes yield TI-elastic constants remarkably close to the actual TI-elastic constants as shown in Table 4b. Hence, we have again validated the proposed workflow of inverting velocity data from horizontal and deviated boreholes.

TABLE 4b

Bakken shale: Comparison of inverted and actual
TI-elastic constants (horizontal and deviated)

| Well deviations used | $C_{11}$ (GPa) | $C_{33}$ (GPa) | $C_{13}$ (GPa) | $C_{44}$ (GPa) | $C_{66}$ (GPa) |
|---|---|---|---|---|---|
| 90 and 15 degrees | 40.894 | 26.9 | 8.5 | 10.50 | 15.30 |
| 90 and 20 degrees | 40.894 | 26.901 | 8.4981 | 10.50 | 15.301 |
| 90 and 30 degrees | 40.894 | 26.902 | 8.499 | 10.50 | 15.30 |
| 90 and 45 degrees | 40.894 | 26.9 | 8.5 | 10.5 | 15.3 |
| Actual TI-elastic constants | 40.9 | 26.9 | 8.5 | 10.50 | 15.30 |

To invert for all five TI-elastic constants, it may be important to distinguish between the SH-wave and qSV-wave velocities measured by the cross-dipole tool. Depending upon the borehole deviation or relative dip with respect to the borehole axis, either the SH-wave or qSV-wave might exhibit larger velocity than the other. Insofar as the SH-wave is a pure shear wave, and qSV-wave is a quasi-shear wave that also has an axial component, one may expect the receiver amplitude of the SH-wave to be larger than that of the qSV-wave as recorded by the hydrophones on the borehole axis. In addition, synthetic plane wave velocities as a function of borehole deviation may also help in the identification of the SH-wave and qSV-wave velocities after processing the cross-dipole data.

The phase correspondence rule as seen in Table 5 states that plane wave velocities measured using a sonic tool in a deviated borehole are phase velocities with the borehole axis aligned with the phase direction of the propagating wavefront.

TABLE 5

Summary of solutions to TI-elastic constants
with plurality of boreholes

| Input | Output | Comments |
|---|---|---|
| Vertical/Deviated Vertical: $C_{33}$, $C_{55}$ Deviated: qP and qSV velocities | $C_{11}$, $C_{66}$, and $C_{13}$ | Uses qP and qSV wave velocities using phase correspondence rule |
| Horizontal/Deviated Horizontal: $C_{11}$, $C_{55}$, $C_{66}$ Deviated: qP and qSV velocities | $C_{33}$ and $C_{13}$ | Uses qP and qSV wave velocities using phase correspondence rule |
| Two different deviations Deviated 1: qP, SH and qSV wave velocities Deviated 2: qP, SH and qSV wave velocities | $C_{11}$, $C_{33}$, $C_{55}$, $C_{66}$, and $C_{13}$ | Uses qP, qSV, and SH wave velocities from two deviated boreholes following phase correspondence rule |
| Vertical/Horizontal/Deviated Vertical: $C_{33}$, $C_{55}$ Horizontal: $C_{11}$, $C_{55}$, $C_{66}$ | $C_{13}$ | (a) Uses both qP and qSV velocities following phase correspondence rule; (b) Uses only qSV velocity following phase correspondence rule |

TI-Elastic Constants from a Single Horizontal Well Data

Production of hydrocarbons from organic shale-gas reservoirs requires horizontal well drilling that can extend to more than 10,000 feet from the vertical pilot well. Such large horizontal distances from the vertical pilot well may lead to challenges in combining sonic data from well trajectories with different deviations to enable inversion for all five TI-elastic constants within a homogeneous lithology. Optimal completion of such lateral producer wells may require estimates of all five TI-elastic constants from a single horizontal well sonic data. Inversion for the vertical compressional modulus $C_{33}$ and to a lesser degree the modulus $C_{13}$ from sonic data acquired solely from a single horizontal well remains a challenge in the existing workflow. To overcome these limitations, we propose a new workflow that combines reflection data from a nearby horizontal proximate stiff layer, for example, a limestone (or stiff calcite) layer, together with a standard sonic logging to output both $C_{33}$ and $C_{13}$ with enhanced accuracy and reliability. This workflow may include the following steps:

1. Process the refracted compressional headwave and cross-dipole sonic data from a horizontal borehole parallel to the $X_1$-axis to output $C_{11}$, $C_{66}$, $C_{44}$, $C_{13}$, and $C_{55}$. Note that $C_{44}=C_{55}$ in a TIV-formation.

2. Analyze the reflection data from a horizontal proximate stiff layer, e.g., a limestone (or calcite) stringer, to estimate the reflector distance D from the borehole surface for a given offset between the source and receiver positions.
3. Estimate the qP-wave angle from the TI-symmetry ($X_3$-) axis as a function of T-R (Z) spacing and reflector distance D.
4. Construct multiple travel-time equations for the reflected qP-waves as a function of source and receiver positions, and exact equations for the qP-wave velocity at an angle $\theta$ from the TI-symmetry axis.
5. Use at least three travel-time equations to solve for the unknowns $C_{33}$, $C_{13}$, and D. If the elastic modulus $C_{13}$ is known from the inversion of dipole flexural dispersions, one may invert for the two remaining unknowns $C_{33}$ and D.

The incident angle $\theta_1$ of qP-wave may be described by the following Eq. (56):

$$\tan\theta = \frac{Z/2}{D}, \qquad (56)$$

where the angle $\theta$ denotes $\theta_1$, $\theta_2$, $\theta_3$ for the corresponding offsets $Z(=Z_1, Z_2,$ and $Z_3)$, respectively. The travel-time for a chosen ray path may be expressed by Eq. (57):

$$t_1 = \frac{\sqrt{Z_1^2 + 4D^2}}{V_{qP}(\theta_1)}, \qquad (57)$$

where $V_{qP}(\theta)$ denotes the velocity of qP-waves propagating at an angle $\theta$ from the TI-symmetry axis. This velocity $V_{qP}(\theta)$ may be expressed in terms of the rotated $C_{33}^{l}(\theta)$ as expressed by the following Eq. (58):

$$V_{qP}(\theta) = \sqrt{\frac{C_{33}^{l}(\theta)}{\rho}}, \qquad (58)$$

where $\rho$ is the mass density of the anisotropic formation and, as expressed in Eq. (59):

$$\rho V_{qP}^2(\theta) = C_{33}^{l}(\theta) = C_{33}[1+2\varepsilon\sin^4\theta + 2\delta\sin^2\theta\cos^2\theta], \qquad (59)$$

based on a weak anisotropy approximation, whereby Thomsen parameters are given by Eq. (60):

$$\varepsilon = \frac{C_{11} - C_{33}}{2C_{33}} < 1, \qquad (60)$$

$$\delta = \frac{(C_{13} + C_{55})^2 - (C_{33} - C_{55})^2}{2C_{33}(C_{33} - C_{55})} < 1,$$

$$\gamma = \frac{C_{66} - C_{55}}{2C_{55}} < 1.$$

Note that the moduli $C_{11}$, $C_{55}$, and $C_{66}$ may be directly estimated from the refracted quasi-compressional, the slow and fast dipole shear wave velocities, respectively, from a sonic tool in a horizontal borehole parallel to the $X_1$-axis. The two remaining TI-elastic constants to be estimated are $C_{33}$ and $C_{13}$.

The exact equation for $V_{qP}(\theta)$ may be obtained from the solution of the Kelvin-Christoffel equations in the presence of strong anisotropy and may be expressed as Eq. (61):

$$\rho V_{qP}^2(\theta) = \frac{C_{33}^{l} + C_{55}^{l} + \left[(C_{33}^{l} + C_{55}^{l})^2 - 4(C_{33}^{l}C_{55}^{l} - C_{35}^{l}C_{35}^{l})\right]^{1/2}}{2}, \qquad (61)$$

where, as expressed in Eqs. (62)-(64):

$C_{33}^{l}(\theta) = b_1 C_{33} + b_2 C_{13} + b_3$, $b_1 = \cos^4\theta$, $b_2 = 2\sin^2\theta\cos^2\theta$, $b_3 = C_{11}\sin^4\theta + C_{55}\sin^2 2\theta$, (62)

$C_{55}^{l}(\theta) = b_4 C_{33} + b_5 C_{13} + b_6$, $b_4 = (1-\cos 4\theta)/8$, $b_5 = -(\sin^2 2\theta)/2$, $b_6 = [C_{11}\sin^2 2\theta + 2C_{55}(1+\cos 4\theta)]/4$, (63)

$C_{35}^{l}(\theta) = b_7 C_{33} + b_8 C_{13} + b_9$, $b_7 = -\sin 2\theta(1-\cos 4\theta)/4$, $b_8 = (\sin 2\theta \cos 2\theta)/2$, $b_9 = C_{11}(\sin^2\theta \sin 2\theta)/2 + C_{55}\sin 2\theta \cos 2\theta$. (64)

Figure 9:
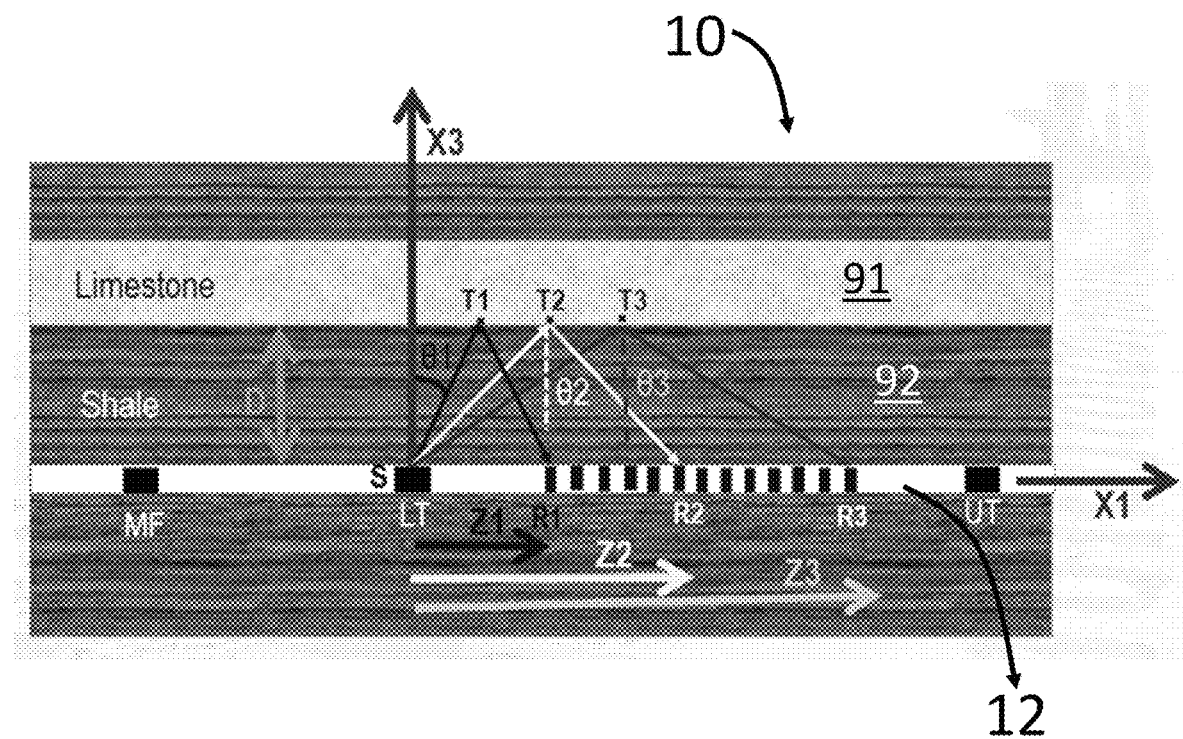
FIG. 9 is a schematic diagram of reflected ray paths of qP-waves emanating at various angles from the TI-symmetry ($X_3$-) axis in accordance with embodiments of the present disclosure.

FIG. 9 is a schematic diagram of reflected ray paths of qP-waves emanating at angles $\theta_1$, $\theta_2$, and $\theta_3$ from the TI-symmetry ($X_3$-) axis. The ray-paths depict effective offsets $Z_1$, $Z_2$, and $Z_3$ of the receivers from the source S. A sonic logging tool in a borehole 12 may have, for example, 13 receiver stations $R_1$, $R_2$, $R_3$, etc., three monopole transmitters (only far monopole transmitter MF shown) and two dipole transmitters (lower dipole transmitter LT and upper dipole transmitter UT). The formation 10 may include shale 92 containing a borehole 12 and a proximate stiff layer, e.g., limestone 91, at a reflector distance D from the borehole surface. The borehole 12 may be perpendicular to the TI-symmetry ($X_3$-) axis and parallel to the $X_1$-axis.

Corresponding to the three ray paths depicted in FIG. 9, one may construct three travel-time equations to solve for the three unknowns $C_{33}$, $C_{13}$, and D. The three travel-time equations may take the form, as expressed in Eqs. (65)-(67):

$$V_{qP}^2(\theta_1)t_1^2 = Z_1^2 + 4D^2, \qquad (65)$$

$$V_{qP}^2(\theta_2)t_2^2 = Z_2^2 + 4D^2, \qquad (66)$$

$$V_{qP}^2(\theta_3)t_3^2 = Z_3^2 + 4D^2, \qquad (67)$$

Note that $V_{qP}(\theta)$ may be obtained from Eq. (58) using a weak anisotropy approximation, or from Eq. (61) that represents the exact solution for quasi-P wave velocity for propagation at an angle $\theta$ from the TI-symmetry axis. Eq. (61) is the exact solution of the Kelvin-Christoffel equations for plane waves in anisotropic formations.

If $C_{13}$ is known from the inversion of dipole flexural dispersion, the workflow would reduce to the determination of two unknowns $C_{33}$ and the reflector distance D from the reflector layer, for example a limestone layer, and the borehole surface. Once all five TI-elastic constants have been determined from a single horizontal well data, it may be straight-forward to calculate three Thomsen parameters that may then be used in seismic interpretation of AVO as well as geomechanical analysis of organic shale reservoir in terms of anisotropic mechanical properties.

The travel-times $t_1$, $t_2$, and $t_3$ may be estimated from a standard STC processing of monopole (or dipole) waveforms using three different sub-arrays of receivers. The mid-point of the sub-array provides an effective offset of the received waveforms from the source that may then be used in the three travel-time equations. Note that there are two workflows based on whether the expression for the qP-wave velocity $V_{qP}(\theta)$ may be obtained from a weak anisotropy approximation or an exact solution of the Kelvin-Christoffel equations.

Figure 16:
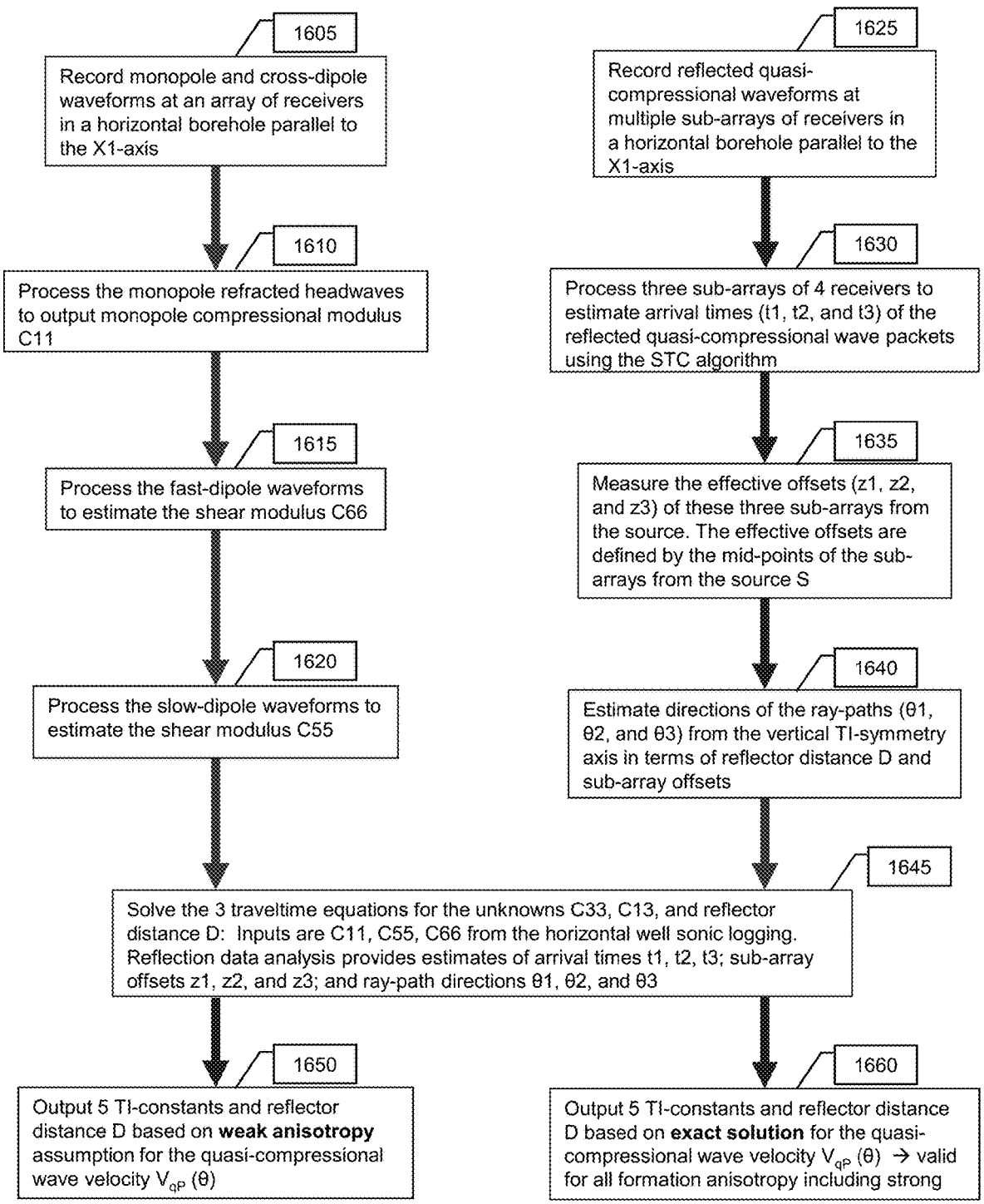
FIG. 16 shows a flowchart of a workflow that uses sonic data from a horizontal borehole together with reflection data from a horizontal proximate stiff layer, e.g., limestone layer, acquired at multiple sub-arrays of receivers in the horizontal borehole to estimate all five TI-elastic constants in accordance with embodiments of the present disclosure.

Referring to FIG. 16, one or more embodiments may provide a method for estimating the TI-elastic constants from a single well using either a weak anisotropy approximation or an exact solution for the quasi-compressional wave velocity $V_{qP}(\theta)$.

Monopole and cross-dipole waveforms may be recorded at an array of receivers in a horizontal borehole parallel to the $X_1$-axis (step 1605). The monopole refracted headwaves may be processed to output monopole compressional modulus $C_{11}$ (step 1610), the fast-dipole waveforms may be processed to estimate shear modulus $C_{66}$ (step 1615), and the slow-dipole waveforms may be processed to estimate shear modulus $C_{55}$ (step 1620). The reflected quasi-compressional waveforms may be recorded at multiple sub-arrays of receivers in the horizontal borehole parallel to the $X_1$-axis (step 1625). Process three subarrays of four receivers to estimate arrival times $t_1$, $t_2$, and $t_3$ of the reflected quasi-compressional wave packets using the STC algorithm (step 1630). Measure the effective offsets $Z_1$, $Z_2$, and $Z_3$ of these three sub-arrays from the source (step 1635) where the effective offsets are defined by the midpoints of the sub-arrays from the source S. Estimate directions of the ray-paths $\theta_1$, $\theta_2$, and $\theta_3$ from the vertical TI-symmetry axis in terms of reflector distance D and sub-array offsets (step 1640). Solve the three travel-time equations for the unknowns $C_{33}$, $C_{13}$, and reflector distance D (step 1645) where inputs are $C_{11}$, $C_{55}$, and $C_{66}$ from the horizontal well sonic logging. Reflection data analysis provides estimates of arrival times $t_1$, $t_2$, and $t_3$; sub-array offsets $z_1$, $z_2$, and $z_3$; and ray-path directions $\theta_1$, $\theta_2$, and $\theta_3$. The five TI-elastic constants and reflector distance D may be output based on the weak anisotropy assumption for the quasi-compressional wave velocity $V_{qP}(\theta)$ (step 1650). As an alternative to step 1650, the five TI-elastic constants and reflector distance D may be output based on the exact solution for the quasi-compressional wave velocity $V_{qP}(\theta)$ (step 1660). When step 1660 is taken rather than step 1650, i.e., when the exact solution for the compressional wave velocity is used rather than the weak anisotropy approximation, the result is valid for all formation anisotropy, including strong anisotropy.

TI-Elastic Constants from a Single Horizontal Well Data

One or more embodiments of the present disclosure may be based on analyzing both refracted and reflected quasi-compressional waves from a nearby horizontal limestone embedded in a thick shale formation. The transmitter and an array of receivers may be placed in a horizontal borehole in the shale formation. Refracted quasi-compressional arrivals from both the shale and limestone layers may be obtained from the recorded waveforms. Below are four observations that may be described by four equations to be solved for four unknowns:

(1) A ray-path of the refracted quasi-compressional wave in the limestone layer may include a qP-wave in the shale layer propagating at a critical angle $\theta_1$ as described by the Snell's law.

(2) The critical angle $\theta_1$ may also be related to the reflector distance D of the limestone layer from the borehole surface, and axial offsets travelled in the shale layer.

(3) The time offset $t_1$ of the limestone arrival from its T-R line may be obtained from the STC plot that may be expressed by the time for the ray to travel through the shale layer and may be given by the ratio of distance travelled in shale and quasi-P wave velocity at an angle $\theta_1$ from the TI-symmetry axis.

(4) Total travel time $t_2$ of the limestone arrival may be estimated from the STC processing of recorded monopole waveforms for a given T-R spacing $Z_{TR}$. Total time $t_2$ includes travel time through the shale layer and travel time through the limestone layer.

Figure 10:
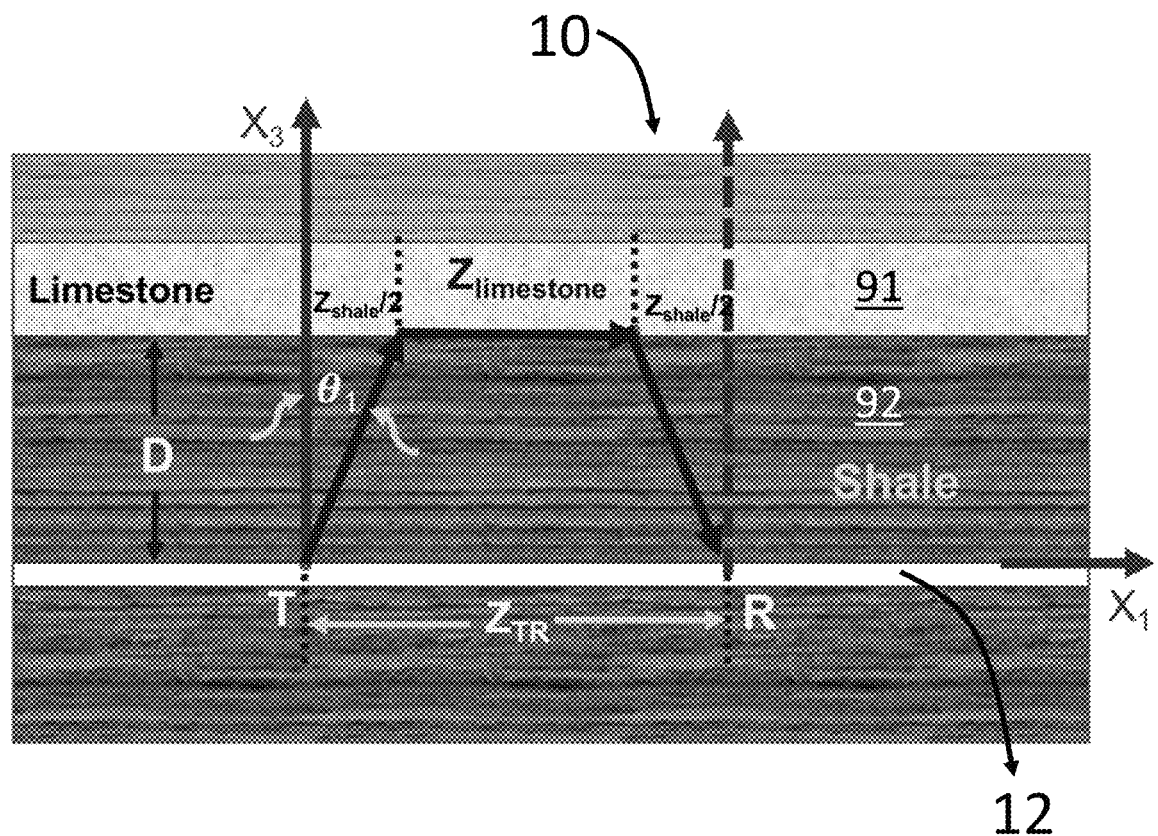
FIG. 10 is a schematic diagram of a refracted ray path of qP-wave in a nearby limestone layer in accordance with embodiments of the present disclosure.

FIG. 10 shows a schematic diagram of a refracted quasi-compressional wave in a subterranean formation 10 traversing a nearby limestone layer 91 emanating at angle $\theta_1$, from the TI-symmetry ($X_3$-) axis. The ray-path depicts effective offsets $Z_{shale}$ and Ziimestone from the transmitter T to the receiver R. The distance of the limestone reflector from the borehole surface is the reflector distance D. The ray path of this wave includes propagation through the shale formation 92 at an angle $\theta_1$ from the TI-symmetry ($X_3$-) axis.

Figure 11:
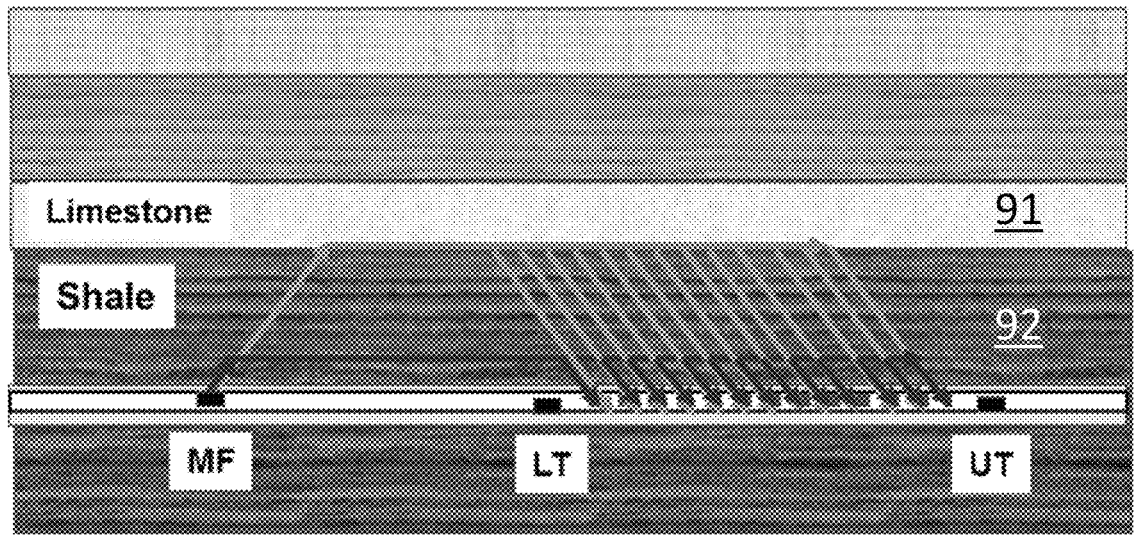
FIG. 11 is a schematic of a sonic logging tool in a horizontal well where the borehole is in a laminated shale with a limestone layer above the borehole in accordance with embodiments of the present disclosure.

FIG. 11 is a schematic of a sonic logging tool in a horizontal well where the borehole 12 is in a laminated shale 92 with a limestone layer 91 above the borehole 12 in accordance with embodiments of the present disclosure. Monopole refracted headwaves may be generated by a monopole source, or transmitter, e.g., a far monopole MF source, and may be recorded by an array of hydrophone receivers such as those located on a sonic tool. The headwaves may be refracted by the laminated shale 92 and by the limestone layer 91.

Figure 12:
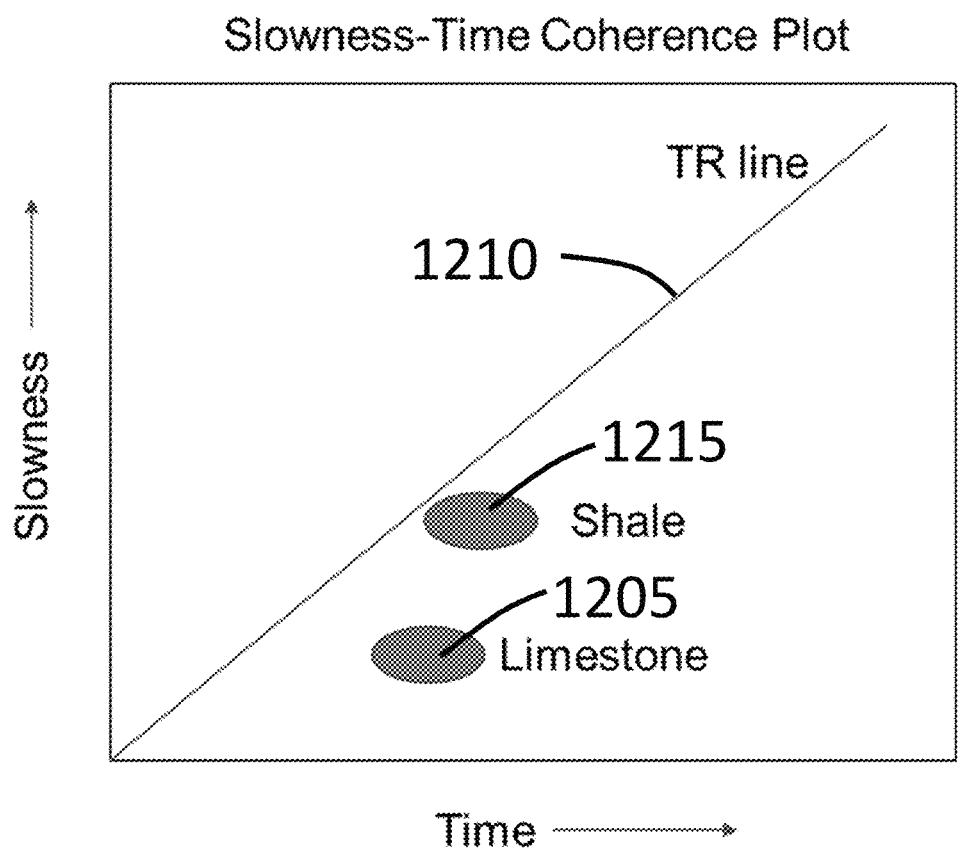
FIG. 12 is a Slowness-Time Coherence (STC) plot showing two refracted quasi-compressional arrivals in accordance with embodiments of the present disclosure.

FIG. 12 is a Slowness-Time Coherence (STC) plot showing refracted quasi-compressional arrivals for shale 1215 and for limestone 1205. First, one may estimate the reflector distance D of limestone reflector, or other proximate stiff layer, from the borehole surface based on the following observations: The distance traveled by limestone refracted quasi-compressional arrival may be expressed by Eq. (68):

$$Z = Z_{limestone} + \sqrt{Z_{shale}^2 + 4D^2}, \quad (68)$$

where D denotes reflector distance from the borehole surface to the proximate stiff layer, and $Z_{shale}$ includes two axial offsets in the shale formation and is given by Eq. (69):

$$Z_{shale} = Z_{TR} Z_{limestone}. \quad (69)$$

The ray-path geometry of refracted wave in the limestone layer yields, as expressed in Eq. (70):

$$\tan\theta_1 = \frac{Z_{shale}/2}{D}, \quad (70)$$

where $\theta_1$ is the incidence angle of quasi-compressional wave in the shale formation.

From Snell's law, the incidence angle $\theta_1$ for a critically refracted headwaves in the limestone layer is given by Eq. (71):

$$\sin\theta_1 = \frac{V_{qP}^{shale}(\theta_1)}{V_P^{limestone}}, \quad (71)$$

where $V_P^{limestone}$ may be assumed to be known from the limestone quasi-compressional arrival.

The limestone quasi-compressional arrival time $t_2$ may be determined from the STC processing of monopole waveforms and may be given by Eq. (72):

$$t_2 = \frac{\sqrt{Z_{shale}^2 + 4D^2}}{V_{qP}^{shale}(\theta_1)} + \frac{Z_{limestone}}{V_P^{limestone}}. \quad (72)$$

The time offset $t_1$ of the limestone arrival from its T-R line may be obtained from the STC-plot and may be given by Eq. (73):

$$t_1 = \frac{\sqrt{Z_{shale}^2 + 4D^2}}{V_{qP}^{shale}(\theta_1)}. \quad (73)$$

Note that the refracted quasi-compressional shale arrival provides an estimate of the $V_{qP}^{shale}$ (90°) that yields the quasi-compressional modulus $C_{11}$ for the shale formation. Solve the above four equations for the unknowns D, $\theta_1$, $V_{qP}^{shale}(\theta_1)$, and $Z_{shale}$ from Eqs. (70), (71), (72) and (73).

By examining both the reflected and refracted sonic quasi-compressional and shear waves from tight formations such as limestone stringers within approximately 4 feet from a horizontal well in a TIV shale, one or more embodiments may describe a method to solve for the three Thomsen parameters, and in particular, $C_{33}$ and $C_{13}$ based on the geometry of the ray-paths and the spacing of the transmitter and receivers of sonic logging tools.

In the STC plot of FIG. 12, the limestone quasi-compressional arrival 1205 may be significantly offset from the T-R line 1210 due to the extra travel time required to pass through the shale layer. As shown in FIG. 12, the shale arrival 1215 may be distinct from the limestone quasi-compressional arrival 1205. The distance from the T-R line 1210 is related to $C_{33}$.

Figure 13:
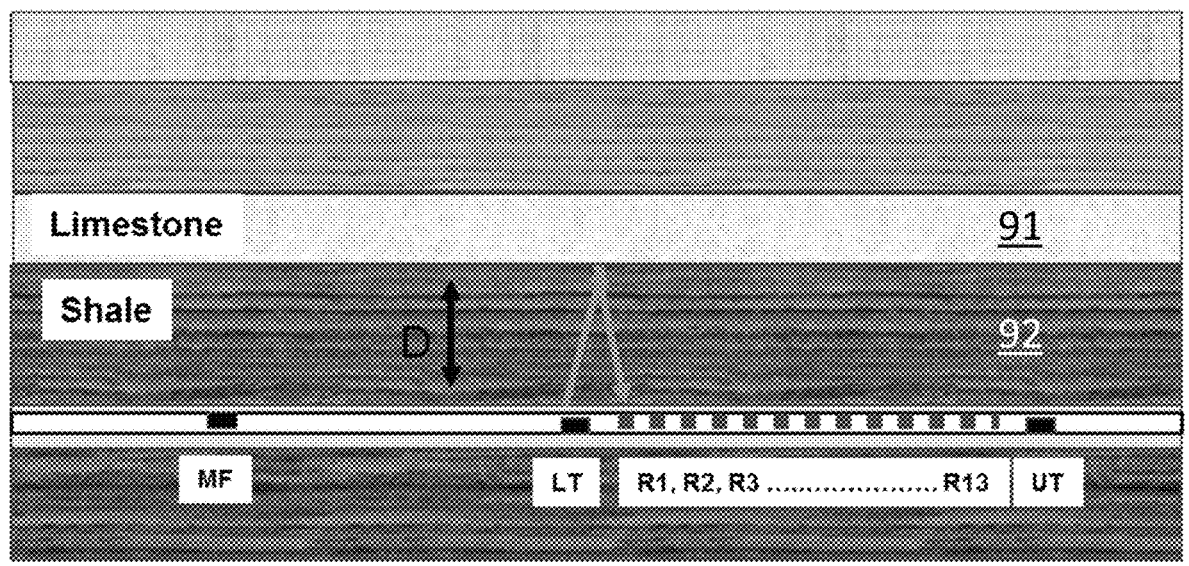
FIG. 13 is a schematic diagram of reflected quasi-compressional waves from a limestone layer recorded at multiple receivers in accordance with embodiments of the present disclosure.

FIG. 13 is a schematic diagram of reflected quasi-compressional waves from a limestone layer 91 recorded at multiple receivers R1, R2, R3, ..., R13 in accordance with one or more embodiments. The number of receivers may vary. When the reflector distance D is known from the analysis of refracted wave from the limestone layer 91, reflected quasi-compressional waves at multiple receivers R1, R2, R3, etc. may be inverted for the TI-elastic constants $C_{33}$ and $C_{13}$.

TABLE 6

Reflection angles from lower transmitter LT to receivers 1-13 for distance D of 1, 2, 3 and 4 ft.

| T-R in ft | Angle 1 ft | Angle 2 ft | Angle 3 ft | Angle 4 ft |
|---|---|---|---|---|
| 1 | 63.47 | 76.00 | 80.58 | 82.92 |
| 1.5 | 53.16 | 69.48 | 76.00 | 79.42 |
| 2 | 45.02 | 63.47 | 71.60 | 76.00 |
| 2.5 | 38.68 | 58.02 | 67.41 | 72.68 |
| 3 | 33.71 | 53.16 | 63.47 | 69.48 |
| 3.5 | 29.76 | 48.84 | 59.77 | 66.40 |

TABLE 6-continued

Reflection angles from lower transmitter LT to receivers 1-13 for distance D of 1, 2, 3 and 4 ft.

| T-R in ft | Angle 1 ft | Angle 2 ft | Angle 3 ft | Angle 4 ft |
|---|---|---|---|---|
| 4 | 26.58 | 45.02 | 56.34 | 63.47 |
| 4.5 | 23.97 | 41.65 | 53.16 | 60.67 |
| 5 | 21.81 | 38.68 | 50.22 | 58.02 |
| 5.5 | 19.99 | 36.05 | 47.51 | 55.52 |
| 6 | 18.44 | 33.71 | 45.02 | 53.16 |
| 6.5 | 17.11 | 31.62 | 42.73 | 50.93 |
| 7 | 15.95 | 29.76 | 40.62 | 48.84 |

The sonic velocities for $V_{qP}(\theta)$ may be derived if the angle ($\theta$) and velocity for the reflected quasi-compressional wave is known. If the reflector distance D is known, the velocity associated with each T-R pair may be determined by the arrival time of the reflected quasi-compressional wave at each receiver. Plotting the velocity of each T-R pair versus the angle (as shown in Table 6) and using the expressions below the Thomsen parameters may be determined.

The quasi-P and quasi-S wave velocities may be expressed in terms of Thomsen parameters and propagation direction from the TI-symmetry axis as shown below in Eqs. (74):

$$V_{qP}(\theta) \approx V_{P0}(1 + \delta\sin^2\theta\cos^2\theta + \varepsilon\cos^4\theta), \quad (74)$$

$$V_{qS}(\theta) \approx V_{S0}\left[1 + \left(\frac{V_{P0}}{V_{S0}}\right)^2 (\varepsilon - \delta)\sin^2\theta\cos^2\theta\right],$$

$$V_S(\theta) \approx V_{S0}(1 + \gamma\sin^2\theta),$$

where, as expressed in Eqs. (75):

$$V_{P0} = \sqrt{\frac{c_{33}}{\rho}}, \quad V_{S0} = \sqrt{\frac{C_{44}}{\rho}}. \quad (75)$$

If the limestone layer is sufficiently far way (about 3 to 4 ft from the borehole surface), the velocity of the first quasi-compressional arrival is approximately equal to $V_{P0}$ that provides a direct estimate of quasi-compressional modulus $C_{33}$ and Thomsen parameter $\delta$.

In addition, the quasi-compressional wave velocity for rays at 45 degrees from the TI-symmetry axis may be determined from the T-R pair as indicated in Table 6. When $V_P(\Theta=45$ degrees) is known from such a T-R pair, the TI-elastic constant $C_{13}$ may be determined from the following Eq. (76):

$$C_{13} = C_{44} + \sqrt{\left[\frac{((2\rho(V_P(45))^2(2\rho(V_P(45))^2(C_{11} + C_{33} + 2C_{44}) +}{(C_{11} + C_{44})(C_{33} + C_{44})}\right]}, \quad (76)$$

where $C_{11}$ and $C_{44}=C_{55}$ are determined from the sonic data acquired along a horizontal borehole parallel to the $X_1$-axis.

Now that $C_{13}$ and $C_{33}$ are determined, and $C_{11}$, $C_{44}$, and $C_{66}$ are known from the horizontal well sonic data, the three Thomsen parameters may be obtained from Eq. (60).

The above method may be valid when the horizontal well deviation is parallel to the shale laminations and the dense limestone layer or some other proximate stiff layer. If the proximate stiff layer is not parallel to the well deviation the STC processing for the refracted P wave should be done using multi-shot processing of sub-arrays and the distance of the STC peak for each subarray should increase or decrease with the T-R spacing based on the apparent dip of the proximate stiff layer. Once the apparent dip is known, the analysis described above for the reflected P arrivals may be corrected based on the cosine of the apparent dip angle.

Figure 17:
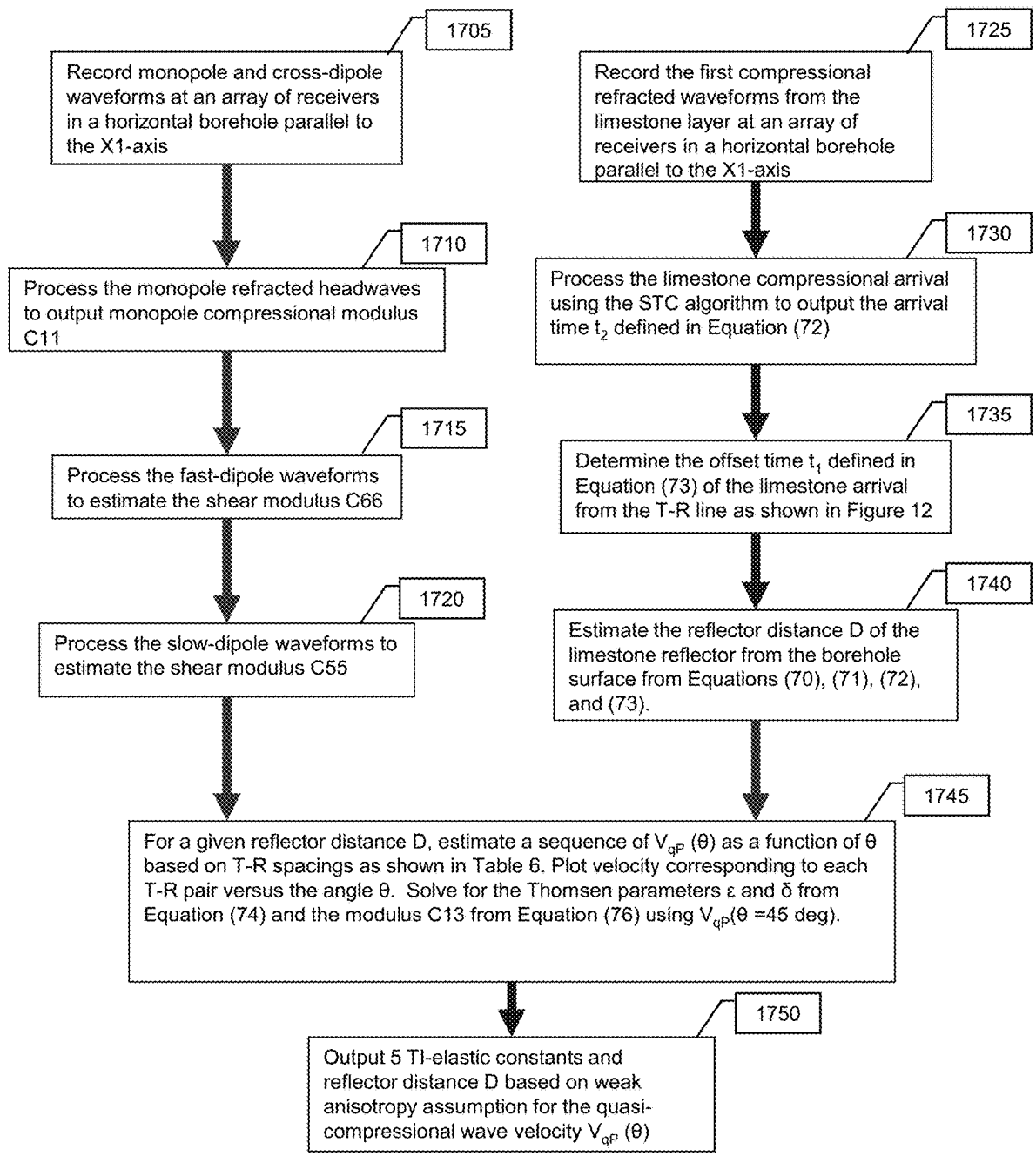
FIG. 17 shows a flowchart of a workflow that uses sonic data from a horizontal borehole together with refraction and reflection data from a horizontal proximate stiff layer, e.g., limestone layer, acquired at multiple sub-arrays of receivers in the horizontal borehole to estimate all five TI-elastic constants in accordance with embodiments of the present disclosure.

FIG. 17 contains a flowchart of the workflow that uses sonic data from a horizontal borehole together with refraction and reflection data from a horizontal limestone layer acquired at multiple sub-arrays of receivers in the horizontal borehole to estimate all five TI-elastic constants in accordance with embodiments of the present disclosure. In step 1705, monopole and cross-dipole waveforms may be recorded at an array of receivers in a horizontal parallel to the $X_1$-axis. The monopole refracted headwaves may be processed to output monopole compressional modulus $C_{11}$ (step 1710), the fast-dipole waveforms may be processed to estimate the shear modulus $C_{66}$ (step 1715), and the slow-dipole waveforms may be processed to estimate the shear modulus $C_{55}$ (step 1720). The first compressional refracted waveforms from the limestone layer (or other proximate stiff layer) may be recorded at an array of receivers in the horizontal borehole parallel to the $X_1$-axis (step 1725). The limestone compressional arrival may be processed using the STC algorithm to output the arrival time $t_2$ defined in Eq. (72) (step 1730). The offset time $t_1$ of the limestone arrival defined in Eq. (73) may be determined from the T-R line as shown in FIG. 12 (step 1735). The reflector distance D of the limestone reflector from the borehole surface may be estimated from Eqs. (70), (71), (72), and (73) (step 1740). For a given reflector distance D, estimate a sequence of $V_{qP}(\theta)$ as a function of θ based on T-R spacings as shown in Table 6. Plot velocity corresponding to each T-R pair versus the angle θ. Solve for the Thomsen parameters E and δ from Eq. (74) and the modulus $C_{13}$ from Eq. (76) using $V_{qP}(\theta=45 \text{ deg})$ (step 1745). Output five TI-elastic constants and reflector distance D based on weak anisotropy assumption for the quasi-compressional wave velocity $V_{qP}(\theta)$ (step 1750).

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for estimating five transversely-isotropic (TI)-elastic constants using borehole sonic data obtained from at least one subterranean borehole in a transversely isotropic formation, wherein the borehole sonic data is acquired by a borehole sonic tool, the borehole sonic tool comprising a source with a bandwidth in a range 0.2 to 20 kHz, the method comprising:

solving for a quasi-compressional qP-wave velocity $V_{qP}(\theta)$ using inversion algorithms based on exact solutions of the Kelvin-Christoffel equations for plane wave velocities in arbitrarily anisotropic formations, wherein the five TI-elastic constants comprise $C_{11}$, $C_{13}$, $C_{33}$, $C_{55}$, and $C_{66}$, wherein the at least one subterranean borehole comprises a horizontal borehole parallel to an $X_1$-axis that is perpendicular to a TI-symmetry $X_3$-axis and a deviated borehole that makes an angle θ with the TI-symmetry $X_3$-axis, and wherein the method further comprises:
recording monopole and cross-dipole waveforms at an array of receivers in the horizontal borehole;
processing monopole refracted headwaves to output compressional modulus $C_{11}$;
processing fast-dipole waveforms to estimate shear modulus $C_{66}$ from a shear wave velocity $V_{SH}$;
processing slow-dipole waveforms to estimate shear modulus $C_{55}$ from a shear wave velocity $V_{SV}$;
solving for the $C_{33}$ using the quasi-compressional wave velocity $V_{qP}(\theta)$ and quasi-shear wave velocity $V_{qSV}(\theta)$ from the deviated borehole;
verifying the estimates of $C_{55}$ and $C_{66}$ against a measured shear wave velocity $V_{SH}(\theta)$; and
solving for $C_{13}$; and
outputting the five TI-elastic constants for use in hydraulic fracture design; and
fracturing a formation according to the hydraulic fracture design.

2. The method of claim 1, wherein the at least one subterranean borehole further comprises a vertical borehole parallel to the TI-symmetry $X_3$-axis and the deviated borehole that makes the angle θ with the TI-symmetry $X_3$-axis, and wherein the method further comprises:
recording monopole and cross-dipole waveforms at an array of receivers in the vertical borehole;
processing monopole refracted headwaves to output compressional modulus $C_{33}$;
processing fast-dipole waveforms to estimate shear modulus $C_{55}$ from shear wave velocity $V_{SH}$ associated with the deviated borehole;
processing slow-dipole waveforms to estimate shear modulus $C_{44}$ from shear wave velocity $V_{SV}$;
solving for $C_{11}$ using quasi-compressional wave velocity $V_{qP}(\theta)$ and quasi-shear wave velocity $V_{qSV}(\theta)$ from the deviated borehole;
solving for $C_{66}$ using $V_{SH}(\theta)$ from the deviated borehole; and
solving for $C_{13}$.

3. The method of claim 1, wherein the at least one subterranean borehole further comprises a first deviated borehole and a second deviated borehole that make angles $\theta_1$ and $\theta_2$, respectively, with the TI-symmetry $X_3$-axis, and wherein the method further comprises:
recording monopole and cross-dipole waveforms at an array of receivers in the first and second deviated boreholes;
processing the monopole refracted headwaves to output quasi-compressional wave velocities $V_{qP}(\theta_1)$ and $V_{qP}(\theta_2)$;
processing one or more dipole waveforms associated with the cross-dipole waveforms to estimate shear wave velocities $V_{SH}(\theta_1)$ and $V_{SH}(\theta_2)$;
processing the one or more dipole waveforms to estimate quasi-shear wave velocities $V_{qSV}(\theta_1)$ and $V_{qSV}(\theta_2)$;

solving for the $C_{66}$ and $C_{44}$ using additional shear wave velocities $V_{SH}(\theta_1)$ and $V_{SH}(\theta_2)$ from the first and second deviated boreholes, respectively;
solving for the $C_{33}$ and the $C_{11}$; and
solving for the $C_{13}$.

4. The method of claim 1, wherein the at least one subterranean borehole further comprises a vertical borehole parallel to the TI-symmetry $X_3$-axis, the horizontal borehole parallel to an $X_1$-axis and perpendicular to the TI-symmetry $X_3$-axis, and the deviated borehole that makes the angle $\theta$ with the TI-symmetry $X_3$-axis, and wherein the method further comprises:
recording monopole and cross-dipole waveforms at an array of receivers in the vertical, horizontal, and deviated boreholes;
calculating the $C_{33}$ and $C_{44}$ using first additional quasi-compressional VP, first additional quasi-shear $V_{qSV}$, and first additional shear $V_{SH}$ wave velocities from the vertical borehole;
estimating the $C_{11}$, the $C_{55}$, and the $C_{66}$ using second additional quasi-compressional $V_q$, second additional quasi-shear $V_{qSV}$, and second additional shear $V_{SH}$ wave velocities, respectively, from the horizontal borehole; and
estimating the $C_{13}$ from at least one of a group consisting of: compressional $V_{qP}$ and quasi-shear $V_{qSV}$ wave velocities along the deviated borehole.

5. The method of claim 1, further comprising:
recording monopole and cross-dipole waveforms at an array of receivers in the horizontal borehole;
processing the monopole refracted headwaves to output monopole compressional modulus $C_{11}$;
processing fast-dipole waveforms to estimate shear modulus $C_{66}$;
processing slow-dipole waveforms to estimate shear modulus $C_{55}$;
solving three travel-time equations for $C_{33}$, $C_{13}$, and reflector distance D, using as inputs $C_{11}$, $C_{55}$, $C_{66}$ from the borehole sonic data from the horizontal borehole, wherein reflection data analysis provides estimates of arrival times $t_1$, $t_2$, $t_3$; sub-array offsets $z_1$, $z_2$, and $z_3$; and ray-path directions $\theta_1$, $\theta_2$, and $\theta_3$; and wherein the method further comprises:
outputting the five TI-elastic constants and the reflector distance D based on an exact solution for the quasi-compressional wave velocity $V_{qP}(\theta)$.

6. The method of claim 1, wherein the at least one subterranean borehole comprises a horizontal borehole parallel to the $X_1$-axis that is perpendicular to the TI-symmetry $X_3$-axis, and wherein the method further comprises:
recording monopole and cross-dipole waveforms at an array of receivers in the horizontal borehole;
processing monopole refracted headwaves to output monopole compressional modulus $C_{11}$;
processing fast-dipole waveforms to estimate shear modulus $C_{66}$;
processing the slow-dipole waveforms to estimate the shear modulus $C_{55}$;
recording the first quasi-compressional refracted waveforms from a proximate stiff layer at an array of receivers in the horizontal borehole;
processing a proximate stiff layer quasi-compressional arrival using a Slowness-Time Coherence (STC) algorithm to output an arrival time $t_2$;
determining an offset time $t_1$ of a proximate stiff layer arrival from a T-R line from the STC algorithm;
estimating at least one reflector distance D of a proximate stiff layer reflector from a surface of the borehole;
for each reflector distance D, estimating a sequence of $V_{qP}(\theta)$ as a function of the angle $\theta$ based on T-R spacings;
plotting a velocity corresponding to each T-R pair as a function of the angle $\theta$;
solving for Thomsen parameters $\varepsilon$ and $\delta$ and the modulus $C_{13}$ using quasi-compressional wave velocity $V_{qP}$ ($\theta$=45 degrees); and
outputting the five TI-elastic constants and reflector distance D based on a weak anisotropy assumption for the quasi-compressional wave velocity $V_{qP}(\theta)$, wherein the proximate stiff layer is stiffer than a formation between the proximate stiff layer and the horizontal borehole.

7. The method of claim 6, wherein the proximate stiff layer comprises limestone.

8. The method of claim 1, wherein the five TI-elastic constants are determined with a resolution of a borehole sonic tool in an axial direction of one of the at least one subterranean boreholes.

9. The method of claim 1, further comprising:
measuring a true dip of the transversely-isotropic formation; and
determining a relative dip of the transversely-isotropic formation with respect to an axial direction of the horizontal borehole.

10. A method for estimating five transversely-isotropic (TI)-elastic constants using borehole sonic data obtained from a horizontal borehole, wherein the borehole sonic data is acquired by a borehole sonic tool, the borehole sonic tool comprising a source with a bandwidth in a range 0.2 to 20 kHz, in a transversely isotropic formation, the method comprising:
recording monopole and cross-dipole waveforms at an array of receivers in the horizontal borehole parallel to an $X_1$-axis that is perpendicular to a TI-symmetry $X_3$-axis;
processing monopole refracted headwaves to output monopole compressional modulus $C_{11}$;
processing fast-dipole waveforms to estimate shear modulus $C_{66}$;
processing slow-dipole waveforms to estimate shear modulus $C_{55}$;
solving three travel-time equations for $C_{33}$, $C_{13}$, and reflector distance D, using as inputs $C_{11}$, $C_{55}$, $C_{66}$ from the borehole sonic data from the horizontal borehole, wherein reflection data analysis provides estimates of arrival times $t_1$, $t_2$, $t_3$; sub-array offsets $z_1$, $z_2$, and $z_3$; and ray-path directions $\theta_1$, $\theta_2$, and $\theta_3$, wherein the horizontal borehole is parallel to an $X_1$-axis that is perpendicular to a TI-symmetry $X_3$-axis, and wherein the method further comprises:
outputting the five TI-elastic constants and the reflector distance D based on an anisotropy assumption for a quasi-compressional wave velocity $V_{qP}(\theta)$ for use in hydraulic fracture design; and fracturing a formation according to the hydraulic fracture design.

11. A system for locating hydrocarbons in a transversely-isotropic (TI) formation, comprising:
a borehole sonic tool that measures borehole sonic data along at least one subterranean borehole in the formation wherein the borehole sonic tool comprises a source with a bandwidth in a range 0.2 to 20 kHz;
a processor that processes the borehole sonic data to determine five TI-elastic constants as a function of position along the at least one subterranean borehole;

an output device that outputs the five TI-elastic constants as the function of position along the at least one subterranean borehole, wherein determining the five TI-elastic constants comprises:
    solving for a quasi-compressional qP-wave velocity $V_{qP}$ using inversion algorithms based on exact solutions of Kelvin-Christoffel equations for plane wave velocities in arbitrarily anisotropic formations, and wherein the five TI-elastic constants comprise $C_{11}$, $C_{13}$, $C_{33}$, $C_{55}$, and $C_{66}$; and
    outputting the five TI-elastic constants for use in hydraulic fracture design; and fracturing a formation according to the hydraulic fracture design.

12. The system of claim 11, wherein the at least one subterranean borehole comprises a vertical borehole parallel to a TI-symmetry X3-axis and a deviated borehole that makes an angle θ with the TI-symmetry $X_3$-axis, and wherein determining the five TI-elastic constants further comprises:
    recording monopole and cross-dipole waveforms at an array of receivers in the vertical borehole;
    processing monopole refracted headwaves to output compressional modulus $C_{33}$;
    processing fast-dipole waveforms to estimate shear modulus $C_{55}$ from a shear wave velocity $V_{SH}$;
    processing slow-dipole waveforms to estimate shear modulus $C_{44}$ from a shear wave velocity $V_{SV}$;
    solving for $C_{11}$ using the quasi-compressional qP-wave velocity $V_{qP}(θ)$ and a quasi-shear wave velocity $V_{qSV}(θ)$ from the deviated borehole;
    solving for $C_{66}$ using a measured shear wave velocity $V_{SH}(θ)$ from the deviated borehole; and
    solving for $C_{13}$.

13. The system of claim 11, wherein the at least one subterranean borehole comprises a horizontal borehole parallel to an $X_1$-axis that is perpendicular to the TI-symmetry $X_3$-axis and a deviated borehole that makes an angle θ with the TI-symmetry $X_3$-axis, and wherein determining the five TI-elastic constants further comprises:
    recording monopole and cross-dipole waveforms at an array of receivers in the horizontal borehole;
    processing monopole refracted headwaves to output compressional modulus $C_{11}$;
    processing fast-dipole waveforms to estimate shear modulus $C_{66}$ from a shear wave velocity $V_{SH}$;
    processing slow-dipole waveforms to estimate shear modulus $C_{55}$ from a shear wave velocity $V_{SV}$;
    solving for $C_{33}$ using the quasi-compressional qP-wave velocity $V_{qP}(θ)$ and a quasi-shear wave velocity $V_{qSV}(θ)$ from the deviated borehole;
    checking to verify estimates of $C_{55}$ and $C_{66}$ against a measured shear wave velocity $V_{SH}(θ)$; and
    solving for $C_{13}$.

14. The system of claim 11, wherein the at least one subterranean borehole comprises a first and a second deviated borehole that make angles $θ_1$ and $θ_2$, respectively, with a TI-symmetry $X_3$-axis, and wherein determining the five TI-elastic constants further comprises:
    recording monopole and cross-dipole waveforms at an array of receivers in the first deviated borehole and second deviated borehole;
    processing monopole refracted headwaves to output quasi-compressional wave velocities $V_{qP}(θ_1)$ and $V_{qP}(θ_2)$;
    processing dipole waveforms to estimate shear wave velocities $V_{SH}(θ_1)$ and $V_{SH}(θ_2)$;
    processing the dipole waveforms to estimate quasi-shear wave velocities $V_{qSV}(θ_1)$ and $V_{qSV}(θ_2)$;
    solving for $C_{66}$ and $C_{44}$ using the shear wave velocities $V_{SH}(θ_1)$ and $V_{SH}(θ_2)$ from the first and second deviated boreholes, respectively;
    solving for $C_{33}$ and $C_{11}$; and
    solving for $C_{13}$.

15. The system of claim 11, wherein the at least one subterranean borehole comprises a vertical borehole parallel to a TI-symmetry $X_3$-axis, a horizontal borehole parallel to an $X_1$-axis and perpendicular to the TI-symmetry $X_3$-axis, and a deviated borehole that makes an angle θ with the TI-symmetry $X_3$-axis, and wherein determining the five TI-elastic constants further comprises:
    recording monopole and cross-dipole waveforms at an array of receivers in the vertical, horizontal, and deviated boreholes;
    calculating $C_{33}$ and $C_{44}$ using compressional $V_P$, slow shear $V_{SV}$, and fast shear $V_{SH}$ wave velocities from the vertical borehole;
    estimating $C_{11}$, $C_{55}$, and $C_{66}$ using compressional $V_P$, slow-shear $V_{SV}$, and fast-shear $V_{SH}$ wave velocities, respectively, from the horizontal borehole; andYes
    estimating C13 from at least one of a group consisting of: quasi-compressional $V_{qP}(θ)$ and quasi-shear $V_{qSV}(θ)$ wave velocities along the deviated borehole.

16. The system of claim 11, wherein the at least one subterranean borehole comprises a horizontal borehole parallel to an $X_1$-axis that is perpendicular to a TI-symmetry $X_3$-axis, and wherein determining the five TI-elastic constants further comprises:
    recording monopole and cross-dipole waveforms at an array of receivers in the horizontal borehole;
    processing monopole refracted headwaves to output monopole quasi-compressional modulus $C_{11}$;
    processing fast-dipole waveforms to estimate shear modulus $C_{66}$;
    processing slow-dipole waveforms to estimate shear modulus $C_{55}$;
    solving three travel-time equations for $C_{33}$, $C_{13}$, and reflector distance D, using as inputs $C_{11}$, $C_{55}$, $C_{66}$ from the borehole sonic data from the horizontal borehole, wherein reflection data analysis provides estimates of arrival times $t_1$, $t_2$, $t_3$; sub-array offsets $z_1$, $z_2$, and $z_3$, and ray-path directions $θ_1$, $θ_2$, and $θ_3$; and
    outputting the five TI-elastic constants and the reflector distance D based on an exact solution for the quasi-compressional wave velocity $V_{qP}(θ)$.

17. The system of claim 11, wherein the at least one subterranean borehole comprises a horizontal borehole parallel to an $X_1$-axis that is perpendicular to a TI-symmetry $X_3$-axis, and wherein determining the five TI-elastic constants further comprises:
    recording monopole and cross-dipole waveforms at an array of receivers in the horizontal borehole;
    processing monopole refracted headwaves to output monopole compressional modulus $C_{11}$;
    processing fast-dipole waveforms to estimate shear modulus $C_{66}$;
    processing slow-dipole waveforms to estimate shear modulus $C_{55}$;
    recording first quasi-compressional refracted waveforms from a proximate stiff layer at an array of receivers in the horizontal borehole;
    processing a proximate stiff layer quasi-compressional arrival using a Slowness-Time Coherence (STC) algorithm to output an arrival time $t_2$;

determining an offset time $t_1$ of a proximate stiff layer arrival from a T-R line from the STC algorithm;

estimating at least one reflector distance D of a proximate stiff layer reflector from a surface of the horizontal borehole;

for each reflector distance D, estimating a sequence of $V_{qP}(\theta)$ as a function of the angle $\theta$ based on T-R spacings;

plotting a velocity corresponding to each T-R pair as a function of an angle $\theta$;

solving for Thomsen parameters $\varepsilon$ and $\delta$ and modulus $C_{13}$ using quasi-compressional wave velocity $V_{qP}(\theta=45$ degrees); and outputting the five TI-elastic constants and the at least one reflector distance D based on an anisotropy assumption for the quasi-compressional wave velocity $V_{qP}(\theta)$, wherein the proximate stiff layer is stiffer than a formation between the proximate stiff layer and the horizontal borehole.

* * * * *